(12) United States Patent
Hatanaka et al.

(10) Patent No.: US 11,831,830 B2
(45) Date of Patent: Nov. 28, 2023

(54) IMAGE FORMING APPARATUS, SETTING METHOD, AND INFORMATION PROCESSING SYSTEM FOR SETTING VALUES FOR INSTALLED APPLICATION

(71) Applicants: Hiroatsu Hatanaka, Kanagawa (JP); Noboru Tamura, Kanagawa (JP); Tomoki Shibukawa, Tokyo (JP)

(72) Inventors: Hiroatsu Hatanaka, Kanagawa (JP); Noboru Tamura, Kanagawa (JP); Tomoki Shibukawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/654,260

(22) Filed: Mar. 10, 2022

(65) Prior Publication Data
US 2022/0303422 A1    Sep. 22, 2022

(30) Foreign Application Priority Data
Mar. 19, 2021 (JP) .................. 2021-046485

(51) Int. Cl.
*H04N 1/00* (2006.01)
*G06F 8/61* (2018.01)
*G06F 8/65* (2018.01)

(52) U.S. Cl.
CPC .......... *H04N 1/00962* (2013.01); *G06F 8/61* (2013.01); *G06F 8/65* (2013.01); *H04N 1/00408* (2013.01); *H04N 1/00503* (2013.01); *H04N 2201/0094* (2013.01)

(58) Field of Classification Search
CPC ................... H04N 1/00962; H04N 1/00503
See application file for complete search history.

(56) References Cited

U.S. PATENT DOCUMENTS

| | | | |
|---|---|---|---|
| 2006/0274367 A1 | 12/2006 | Yamamoto et al. | |
| 2009/0049442 A1* | 2/2009 | Shimasaki | G06F 8/61 717/174 |
| 2011/0276959 A1* | 11/2011 | Kobayashi | G06F 8/61 717/174 |
| 2012/0030322 A1* | 2/2012 | Kataoka | G06F 9/44505 709/221 |
| 2016/0321452 A1* | 11/2016 | Richardson | H04W 12/128 |
| 2016/0337544 A1 | 11/2016 | Han | |
| 2016/0378412 A1* | 12/2016 | Hayashi | G06F 3/1236 358/1.15 |

(Continued)

FOREIGN PATENT DOCUMENTS

| | | |
|---|---|---|
| EP | 2790395 | 10/2014 |
| JP | 2006-334863 | 12/2006 |

(Continued)

OTHER PUBLICATIONS

Extended European Search Report for 22161985.1 dated Aug. 10, 2022.

*Primary Examiner* — Benjamin O Dulaney
(74) *Attorney, Agent, or Firm* — IPUSA, PLLC

(57) ABSTRACT

An electronic device, a setting method, and an information processing system. The electronic device installs an application, displays on a display, a screen for receiving input of a setting value for a setting item based on setting information that includes one or more setting items for executing the installed application, and control to set the setting value for the setting item received on the screen.

9 Claims, 24 Drawing Sheets

(56) References Cited

U.S. PATENT DOCUMENTS

| | | | | |
|---|---|---|---|---|
| 2017/0371553 A1* | 12/2017 | Nagumo | ............... | G06F 3/0673 |
| 2018/0167523 A1* | 6/2018 | Asai | ...................... | G06F 3/1253 |
| 2018/0341434 A1* | 11/2018 | Han | ...................... | G06F 3/1221 |
| 2020/0409684 A1 | 12/2020 | Shibukawa et al. | | |
| 2021/0195049 A1 | 6/2021 | Ikawa et al. | | |

FOREIGN PATENT DOCUMENTS

| | | |
|---|---|---|
| JP | 2015-138297 | 7/2015 |
| JP | 2016-212855 | 12/2016 |
| JP | 2018-198013 | 12/2018 |
| JP | 2021-099741 | 7/2021 |

* cited by examiner

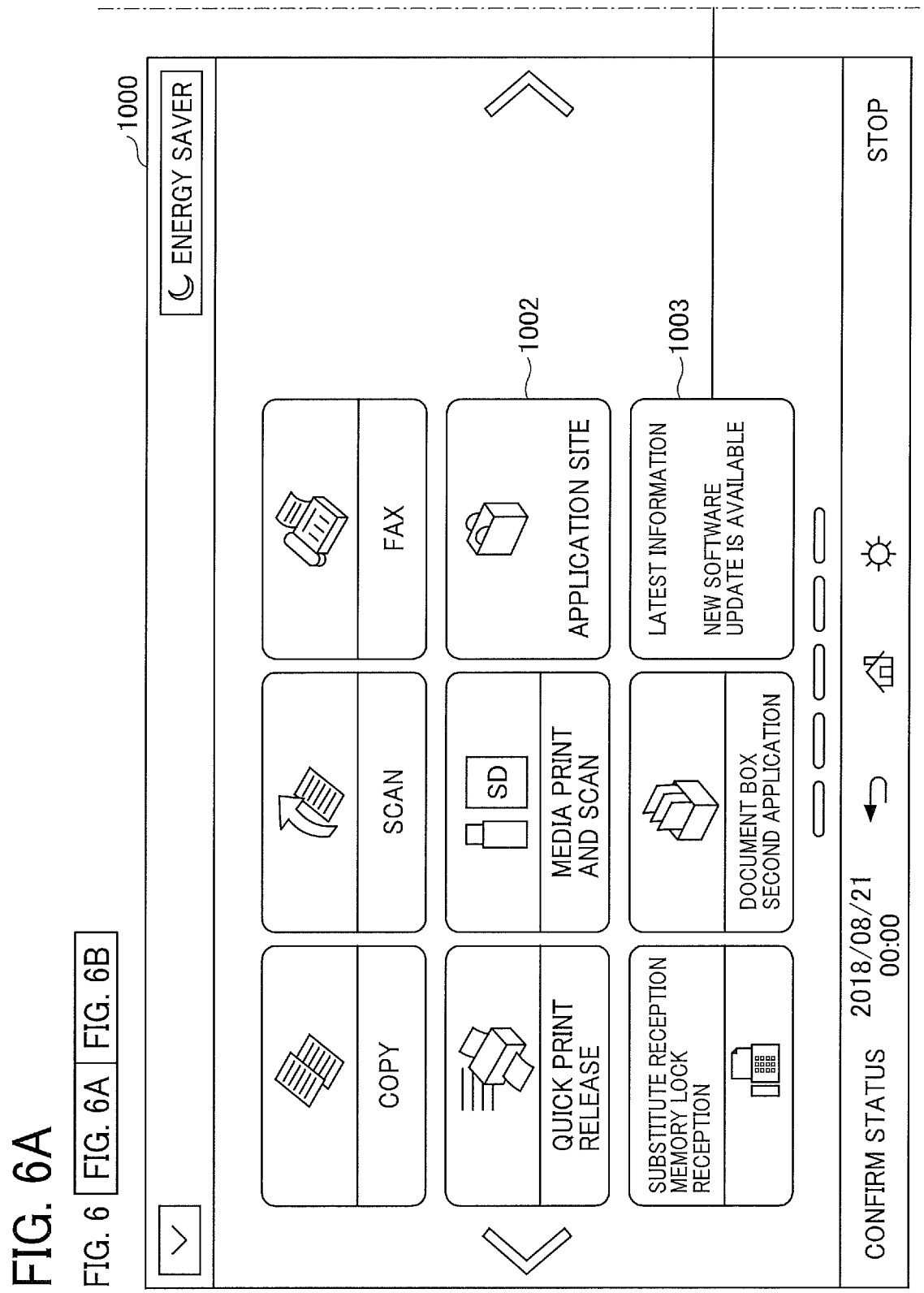

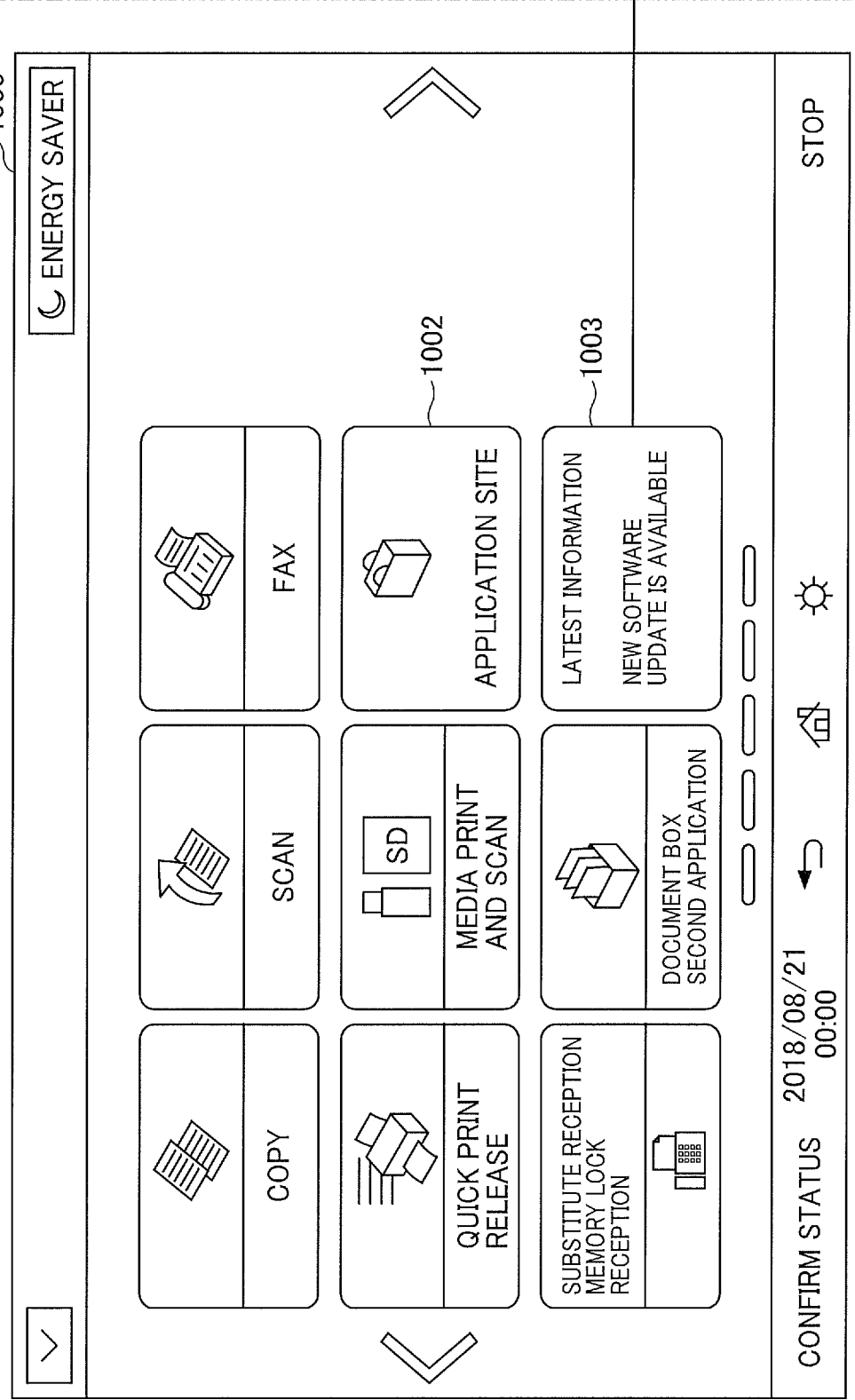

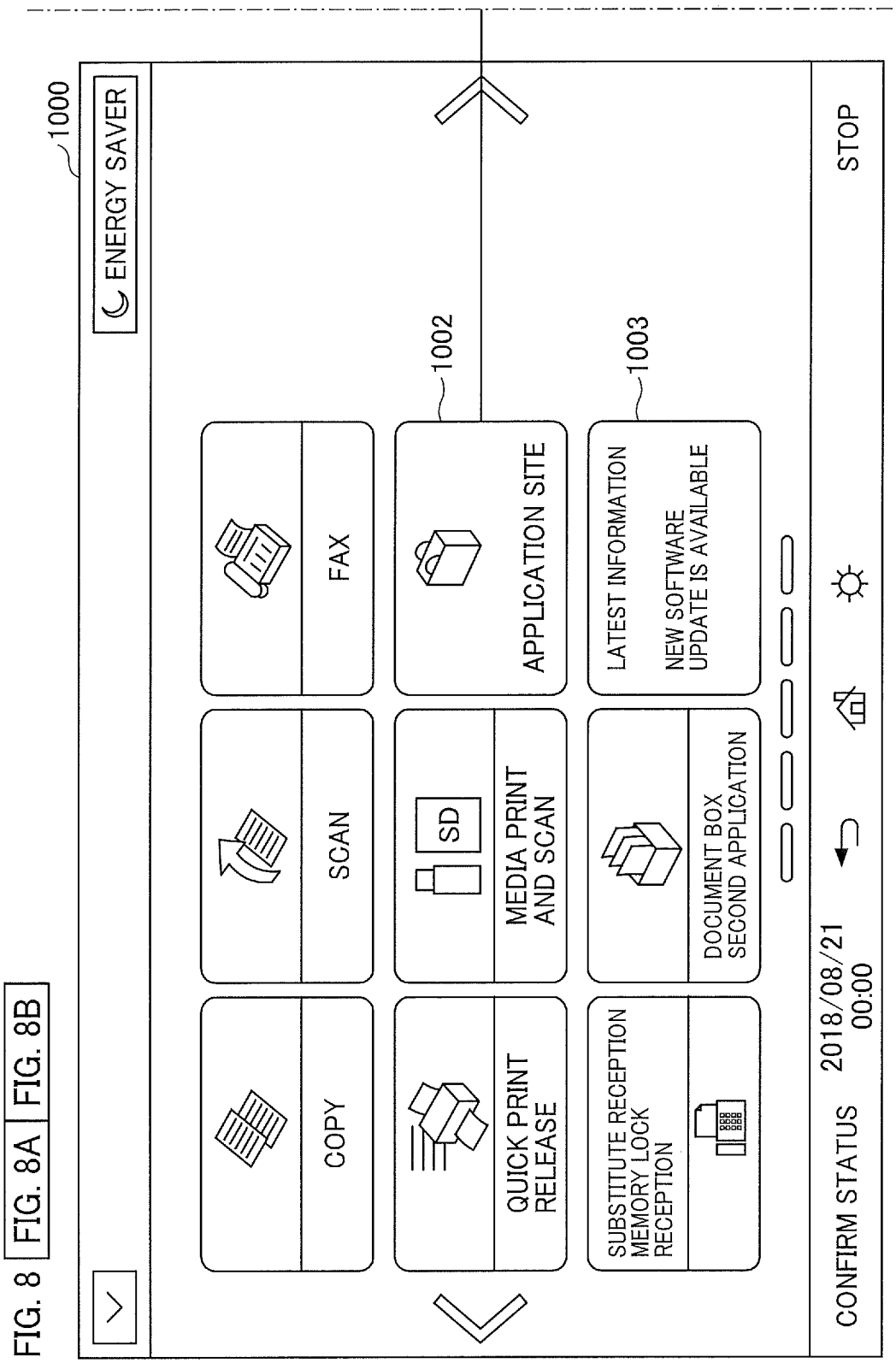

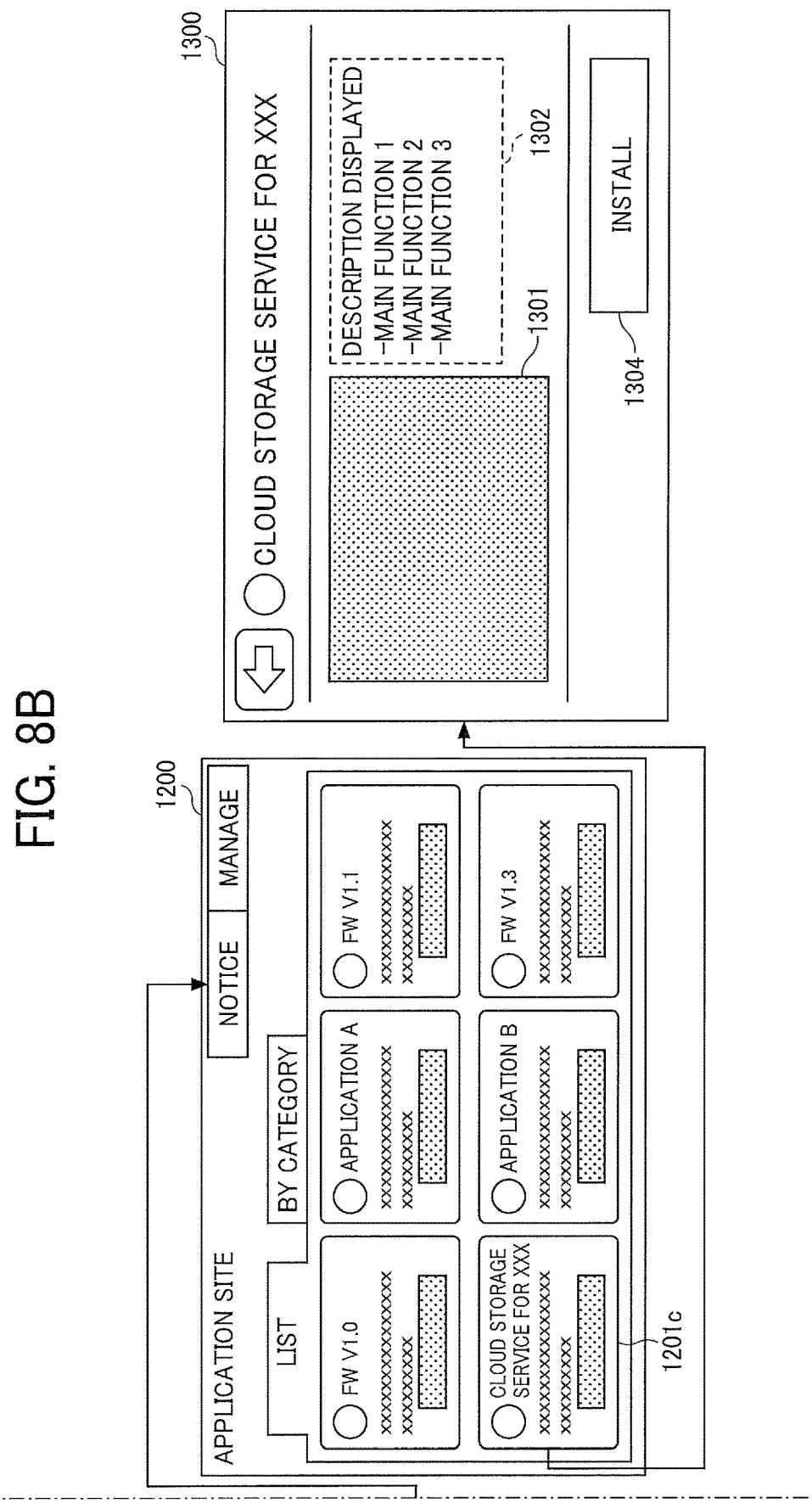

FIG. 11

| SETTING TYPE | SETTING TARGET | CLOUD STORAGE SERVICE FOR XXX | | | |
|---|---|---|---|---|---|
| | | SETTING ITEM | INITIAL VALUE | INPUT TYPE | INPUT RESTRICTION |
| CONTROL PANEL APPLICATION | INITIAL SETTING APPLICATION | PROXY SERVER | NO | RADIO BUTTON | YES/NO |
| | | PROXY SERVER NAME | — | TEXT BOX | ALPHANUMERIC CHARACTER |
| | | PROXY PORT | — | TEXT BOX | NUMERIC CHARACTER |
| | | PROXY USERNAME | — | TEXT BOX | ALPHANUMERIC CHARACTER |
| | | PROXY PASSWORD | — | TEXT BOX | ALPHANUMERIC CHARACTER |
| | ADDRESS BOOK APPLICATION | SETTING TARGET | — | PULLDOWN LIST | ACQUIRE FROM APPLICATION: nameList |
| | | STORAGE USERNAME | — | TEXT BOX | ALPHANUMERIC CHARACTER |
| | | STORAGE PASSWORD | — | TEXT BOX | ALPHANUMERIC CHARACTER |
| | CLOUD STORAGE SERVICE FOR XXX | ... | | | |
| MAIN BODY SYSTEM | SP | EXTERNAL USER AUTHENTICATION | INVALID | RADIO BUTTON | |
| | | ... | | | |

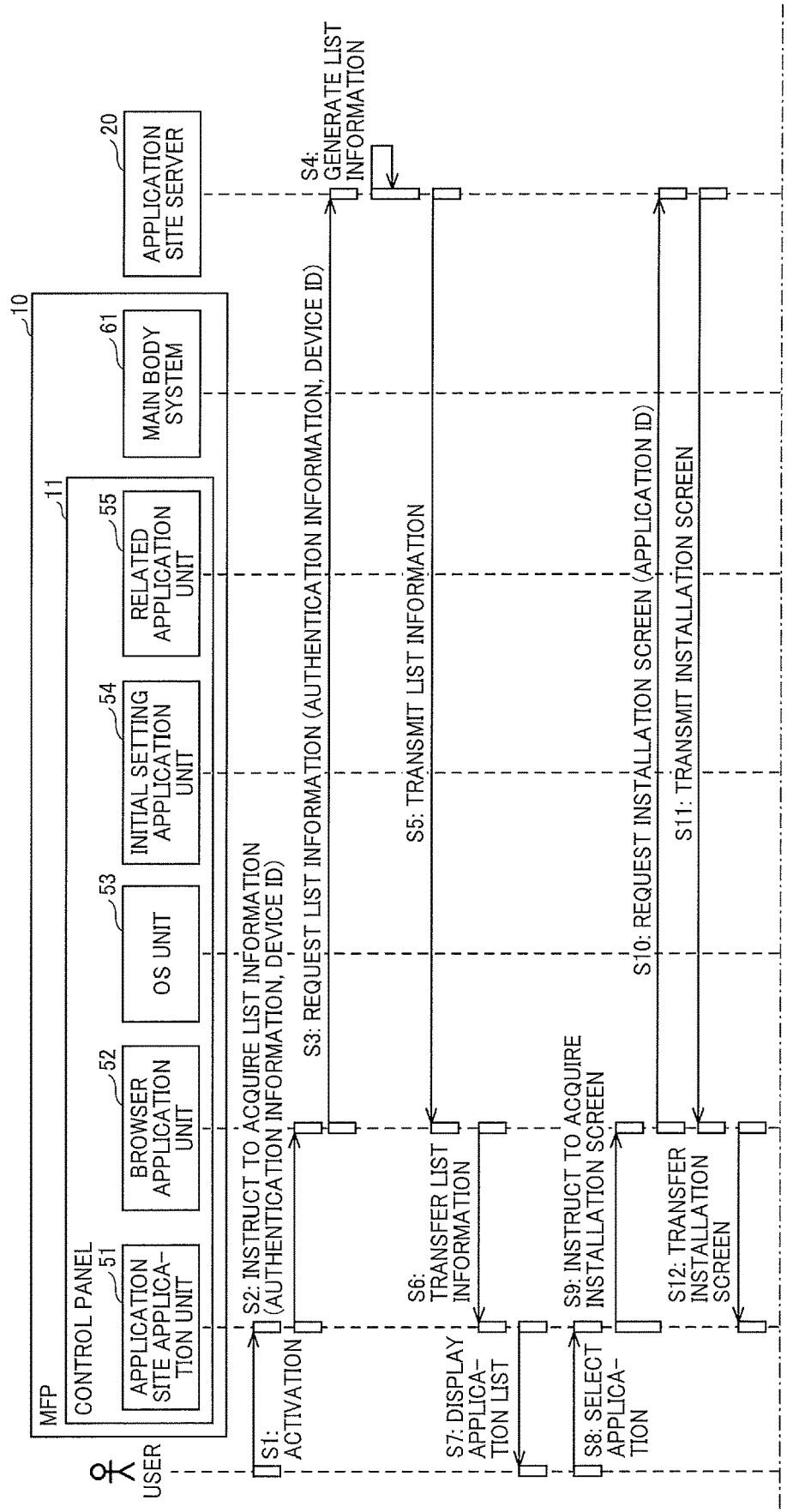

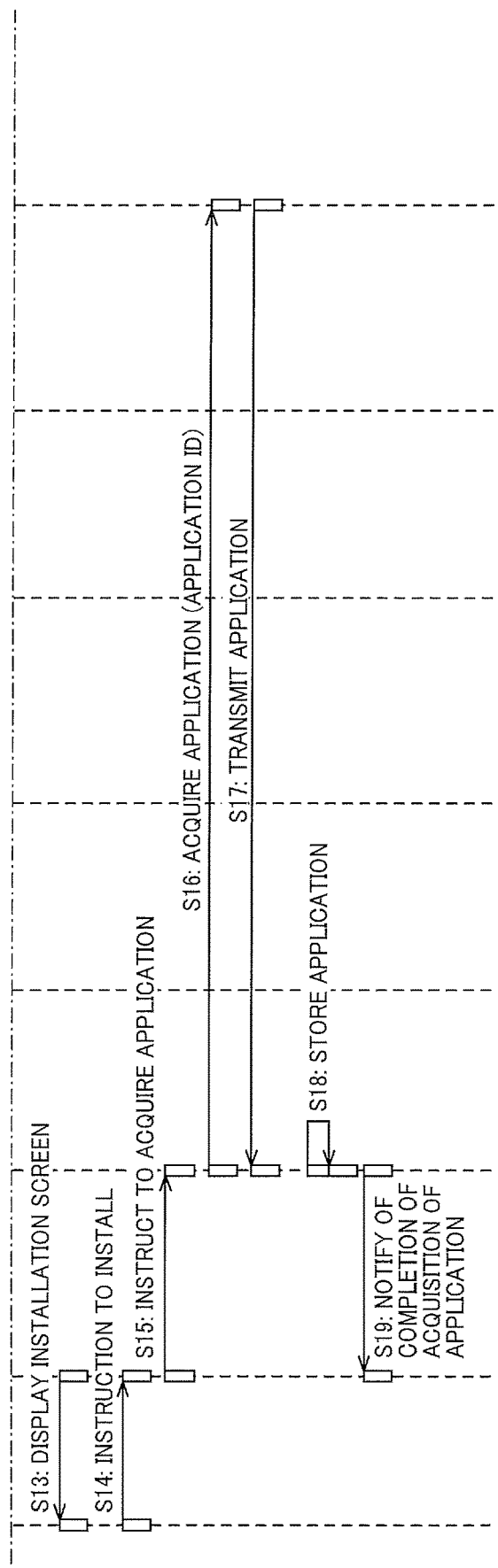

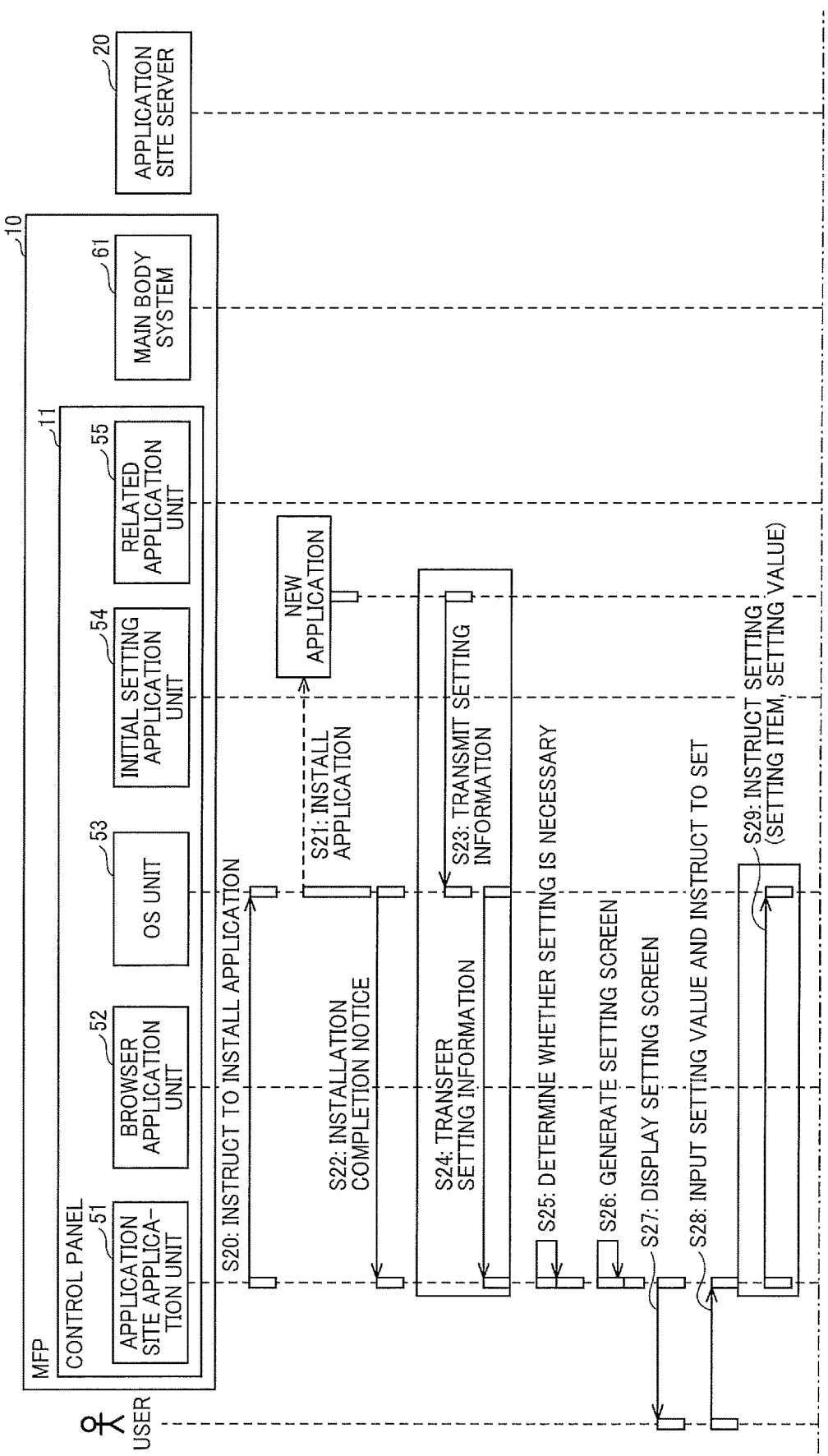

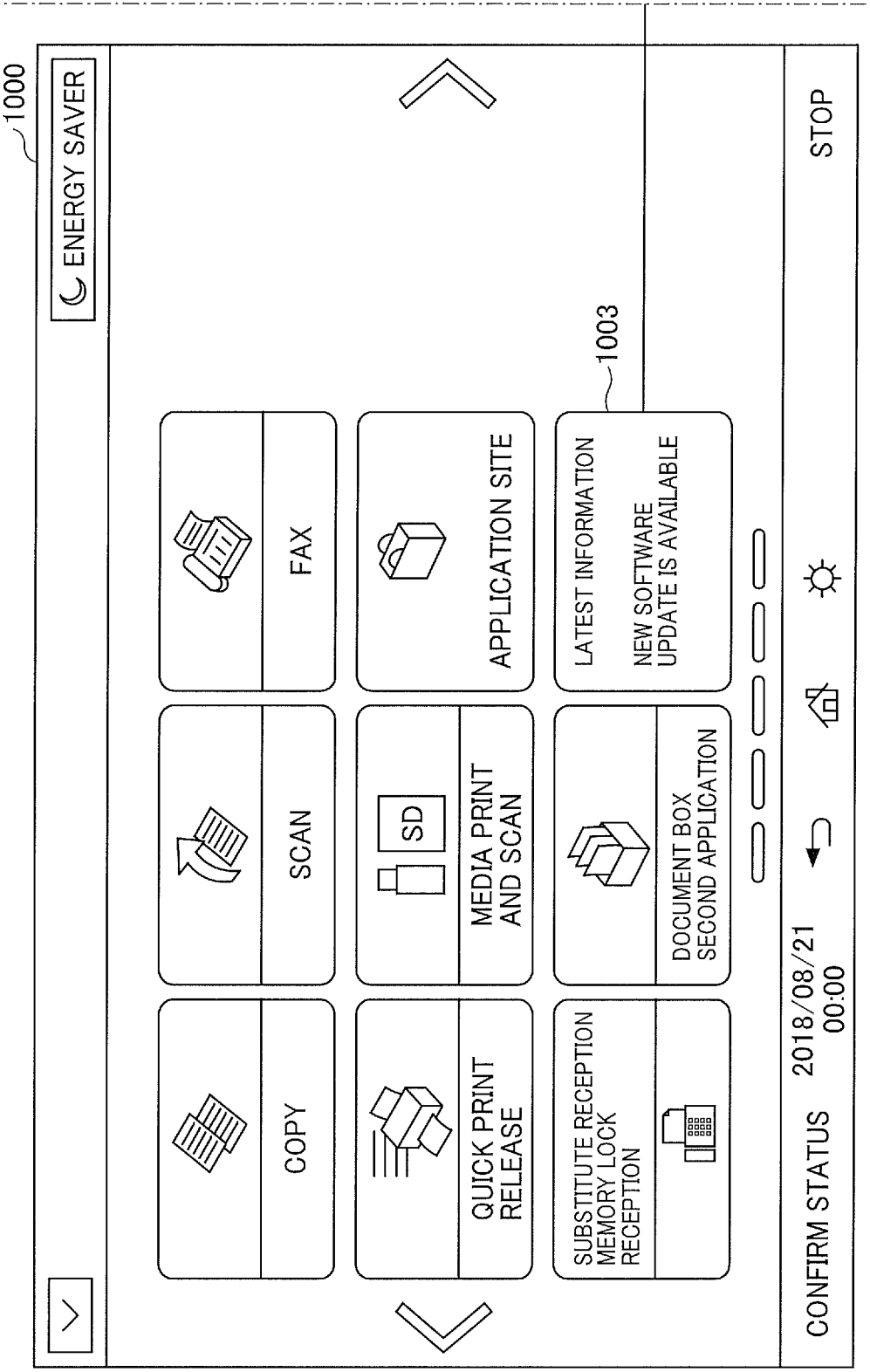

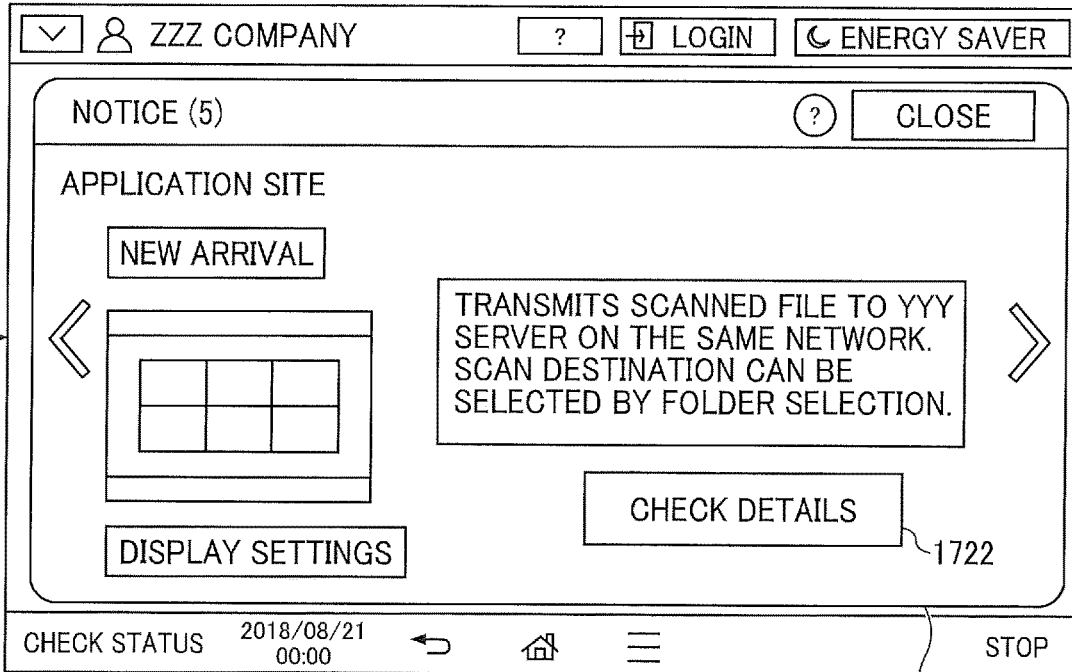
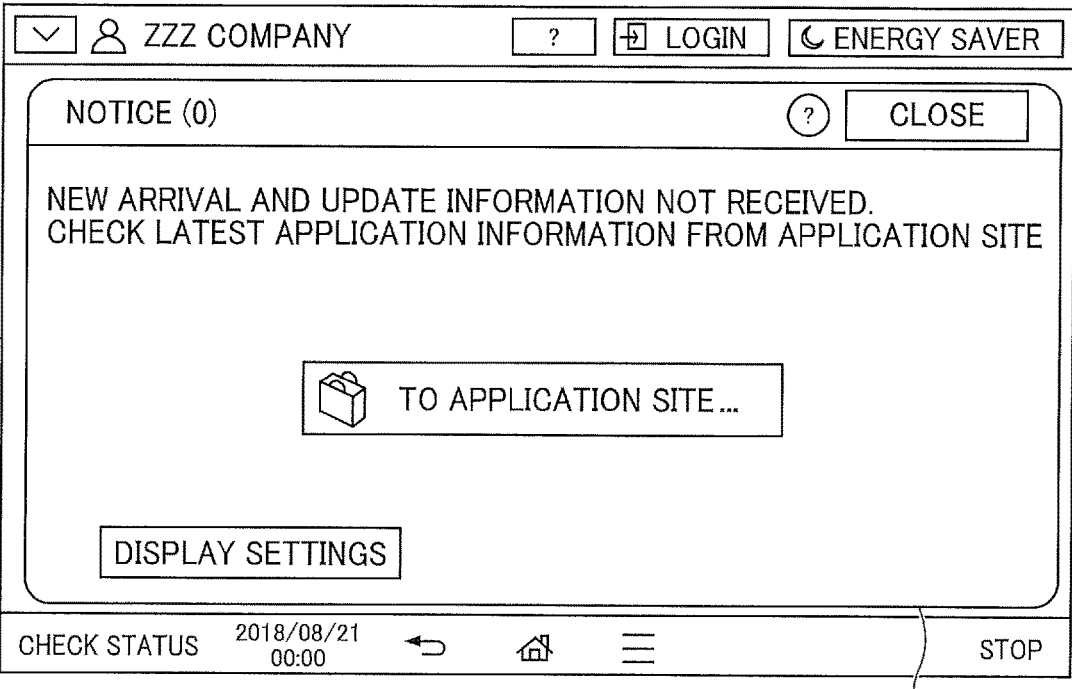
FIG. 15D

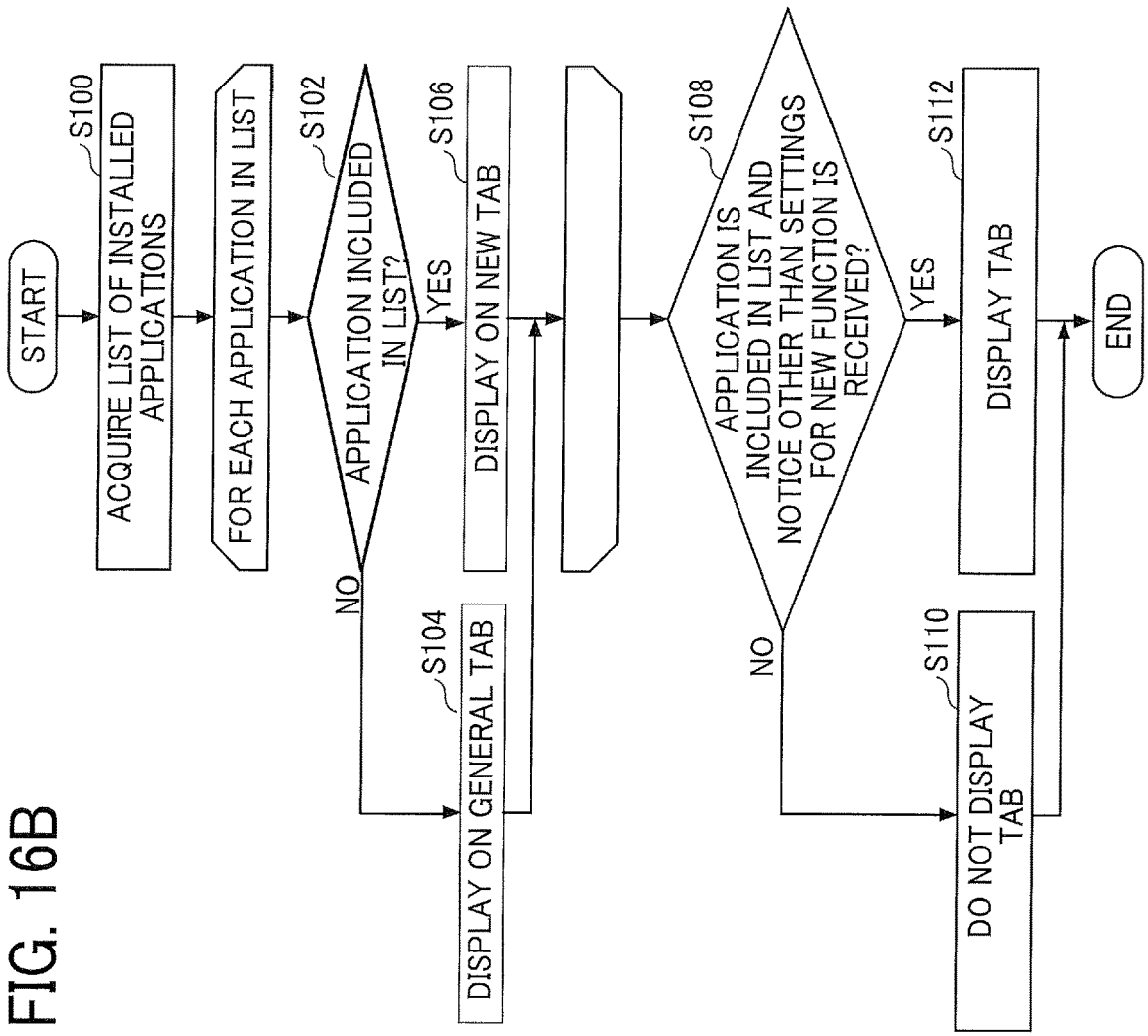

IMAGE FORMING APPARATUS, SETTING METHOD, AND INFORMATION PROCESSING SYSTEM FOR SETTING VALUES FOR INSTALLED APPLICATION

CROSS-REFERENCE TO RELATED APPLICATIONS

This patent application is based on and claims priority pursuant to 35 U.S.C. § 119(a) to Japanese Patent Application No. 2021-046485, filed on Mar. 19, 2021, in the Japan Patent Office, the entire disclosure of which is hereby incorporated by reference herein.

BACKGROUND

Technical Field

The present disclosure relates to an electronic device, a setting method, and an information processing system.

Related Art

Conventionally, a technique for automatically updating an application and firmware in a multifunction peripheral (MFP), which is an example of an electronic device, is known.

As such a technique for automatically updating firmware and the like, a technique for automatically updating necessary firmware when installing an application on the MFP from an application market site which is a website that distributes the application is disclosed.

Further, when there is an application that can be updated on the application market site, a technique for automatically updating the MFP is disclosed.

SUMMARY

Embodiments of the present disclosure describe an electronic device, a setting method, and an information processing system. The electronic device installs an application, displays on a display, a screen for receiving input of a setting value for a setting item based on setting information that includes one or more setting items for executing the installed application, and controls to set the setting value for the setting item received on the screen.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 6A and 6B are diagrams illustrating an example of a screen transition;

FIGS. 7A and 7B are diagrams illustrating an example of the screen transition;

FIGS. 8A and 8B are diagrams illustrating an example of the screen transition;

FIG. 11 is a table illustrating an example of setting information;

FIGS. 13A and 13B are a first half of a sequence diagram illustrating an example of a process executed by the information processing system according to embodiments of the present disclosure;

FIGS. 14A and 14B are a second half of the sequence diagram illustrating an example of a process executed by the information processing system according to embodiments of the present disclosure;

FIGS. 15A, 15B, 15C, and 15D are diagrams illustrating an example of a screen transition when a widget on the home screen is pressed; and FIGS. 16A and 16B are a flowchart illustrating an example of a process for determining a screen to be displayed on an operation panel.

Figure 1:
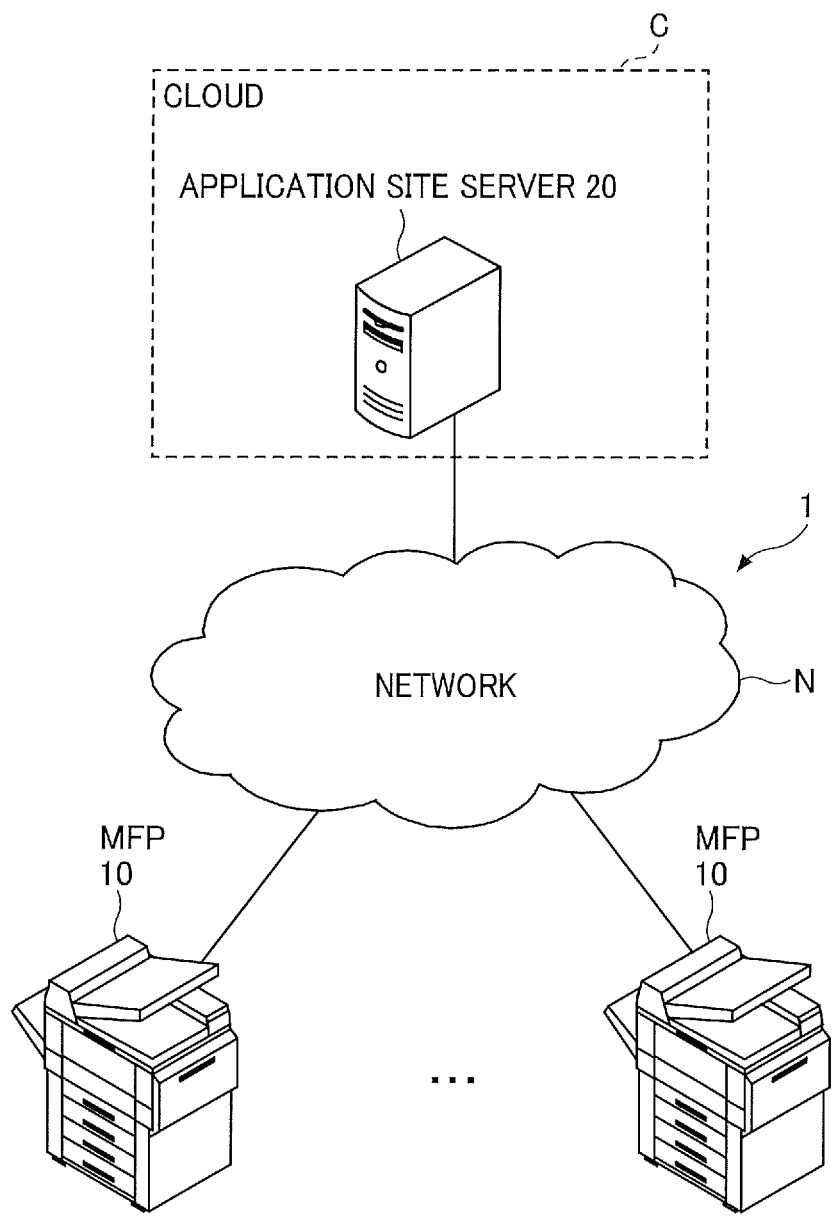
FIG. 1 is a schematic diagram illustrating an example of an information processing system according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of several embodiments of the present disclosure with reference to the drawings.

FIG. 1 is a schematic diagram illustrating a configuration of an information processing system according to the present embodiment. The information processing system 1 of FIG. 1 includes an MFP 10 and an application site server 20, which communicate with each other through a network N. The application site server 20 is provided on the cloud C as, for example, a server that provides a cloud service.

The MFP 10 is an image forming apparatus as an example of an electronic device capable of executing various functions such as a copy function, a scan function, a facsimile function, and a print function. Note that, in FIG. 1, as an example of the electronic device, the MFP 10 which is an example of the image forming apparatus is described, but the present disclosure is not limited to this example. For example, the electronic device is not limited to the MFP 10 as long as the communication function is implemented and an application can be installed.

The electronic device includes, for example, an output device such as a projector (PJ), an interactive white board (a white board having an electronic whiteboard function capable of mutual communication (IWB)), a digital signage, a head up display (HUD) device, and an industrial machine, an imaging device, a sound collecting device, a medical device, a network home appliance, an automobile (connected car), a notebook personal computer (PC), a mobile phone, a smartphone, a tablet terminal, a game console, a personal digital assistant (PDA), a digital camera, a wearable PC or a desktop PC.

The application site server 20 is an information processing apparatus (server) that provides a cloud service through an application site that causes the MFP 10 to download and install a plurality of applications (hereinafter, may be simply referred to as an application) or firmware that can be installed on the MFP 10. The application site is, for example, a website that distributes the application.

The network N is a communication network capable of communication such as a telephone network, the internet, and a local area network (LAN). The configuration of the information processing system 1 illustrated in FIG. 1 is an example. For example, the service provided by the application site may be implemented by a single application site server 20 or may be distributed and implemented by a plurality of servers such as a plurality of application site servers 20.

As described above, at least a part of the functions of the application site server 20 may be implemented by another device. Further, at least a part of the functions of the MFP 10 may be implemented by a device other than the MFP 10.

Figure 2:
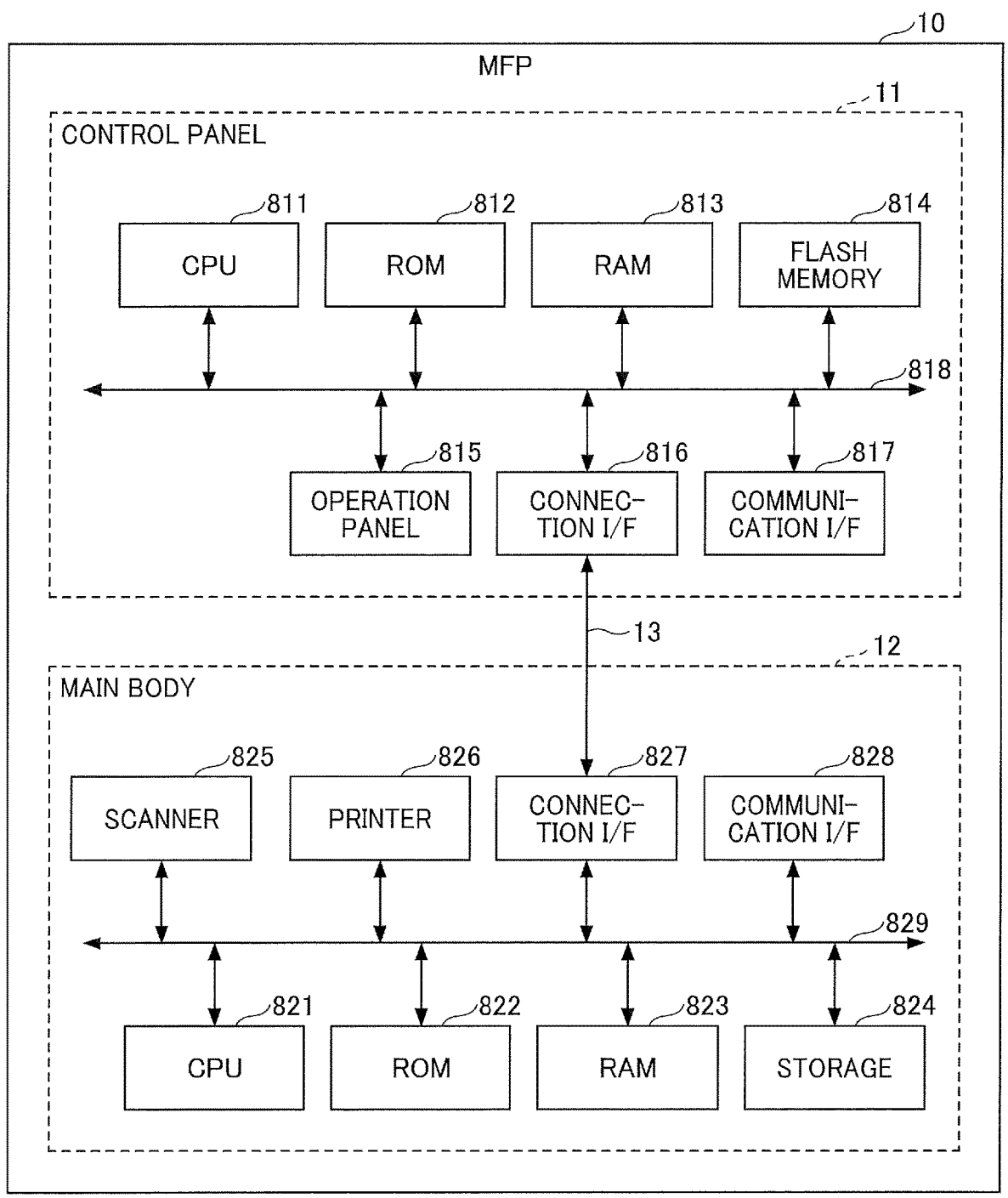
FIG. 2 is a block diagram illustrating an example of a hardware configuration of an MFP according to embodiments of the present disclosure.

The MFP 10 illustrated in FIG. 1 is implemented to have, for example, a hardware configuration illustrated in FIG. 2. FIG. 2 is a block diagram illustrating an example of the hardware configuration of the MFP according to the embodiments of the present disclosure. The MFP 10 includes a control panel 11 that receives user operations, and a main body 12 that implements various image forming functions such as the scan function and the print function. The operation received from the user includes not only the operation of pressing a hard key or the like but also the user's operation on an operation panel.

The control panel 11 and the main body 12 communicate with each other through a dedicated communication path 13. For example, a Universal Serial Bus (USB) standard can be used for the communication path 13, but the communication path 13 is not limited to the USB and may be wired or wireless communication of any standard.

The main body 12 executes a process according to the operation received from the user by the control panel 11. Further, the main body 12 can also communicate with an external device and can execute a process according to an instruction received from the external device.

The control panel 11 illustrated in FIG. 2 includes a central processing unit (CPU) 811, a read only memory (ROM) 812, a random access memory (RAM) 813, a flash memory 814, an operation panel 815, and a connection interface (I/F) 816, a communication I/F 817, and a bus 818.

The CPU 811 is an arithmetic unit that comprehensively controls the operation of the control panel 11. The CPU 811 controls the operation of the entire control panel 11 by executing a program stored in the ROM 812, the flash memory 814, or the like using the RAM 813 as a work area. For example, the CPU 811 implements various functions such as displaying information (image) corresponding to the input received from the user on the operation panel 815.

The ROM 812 is, for example, a non-volatile memory that stores a basic input/output system (BIOS) executed when the control panel 11 is started, various settings, and the like. The RAM 813 is a volatile memory used as the work area or the like of the CPU 811. The flash memory 814 is a non-volatile storage device that stores, for example, an operating system (OS), an application program, various data, and the like.

The operation panel 815 includes an input function and a display function and receives various inputs according to the user's operation and displays various information (for example, information according to the received operation, information indicating the operation status of the MFP 10, setting information, etc.). The operation panel 815 is implemented by, for example, a liquid crystal display (LCD) including a touch panel function.

The operation panel 815 is not limited to the LCD device, and may be implemented by, for example, an organic electro-luminescence (EL) display device equipped with a touch panel function. In alternative to or in addition to the touch panel function, the operation panel 815 may include an operation unit such as hardware keys or a display unit such as an indicator lamp.

The connection I/F 816 is an interface for communicating with the main body 12 through the communication path 13. The communication I/F 817 is an interface for connecting the control panel 11 to the network N and communicating with an external device connected to the network N. The communication I/F 817 is the interface that supports, for example, ETHERNET (registered trademark) and is capable of communication compliant with Transmission Control Protocol/Internet Protocol (TCP/IP) and the like. The bus 818 is a transmission line that connects the above-mentioned components to each other and transmits an address signal, a data signal, various control signals, and the like.

The hardware configuration of the control panel 11 illustrated in FIG. 2 is an example and may include components other than the components illustrated in FIG. 2.

The main body 12 illustrated in FIG. 2 includes a CPU 821, a ROM 822, a RAM 823, a storage 824, a scanner 825, a printer 826, a connection I/F 827, a communication I/F 828, and a bus 829.

The CPU 821 is an arithmetic unit that comprehensively controls the operation of the main body 12. The CPU 821 controls the operation of the entire main body 12 by executing a program stored in the ROM 822, the storage 824, or the like with the RAM 823 as the work area. For example, the CPU 821 implements various functions such as the copy function, the scan function, the facsimile function, and the print function.

The ROM 822 is, for example, a non-volatile memory that stores the BIOS executed when the main body 12 is started, various settings, and the like. The RAM 823 is a volatile memory used as the work area or the like of the CPU 821. The storage 824 is a non-volatile storage device that stores, for example, the OS, the firmware program, the application program, various data, and the like. The storage 824 is implemented by for example, a hard disk drive (HDD) or a solid state drive (SSD).

The scanner 825 is hardware that performs processing for implementing the scan function which is one of the image forming functions that scans and reads a document as an image. The printer 826 is hardware that performs processing for implementing the print function which is one of the image forming functions that prints on a print medium such as paper.

The connection I/F 827 is an interface for communicating with the control panel 11 through the communication path 13. The communication I/F 828 is an interface for connecting the main body 12 to the network N and communicating with the external device connected to the network N. The communication I/F 828 is the interface that supports, for example, ETHERNET and is capable of communication conforming to TCP/IP and the like. The bus 829 is a transmission line that connects the above-mentioned components to each other and transmits the address signal, the data signal, various control signals, and the like.

The hardware configuration of the main body 12 illustrated in FIG. 2 is an example and may include a component other than the components illustrated in FIG. 2. For example, the main body 12 may include a finisher for sorting printed print media or a component such as an automatic document feeder (ADF) for automatically feeding documents.

Figure 3:
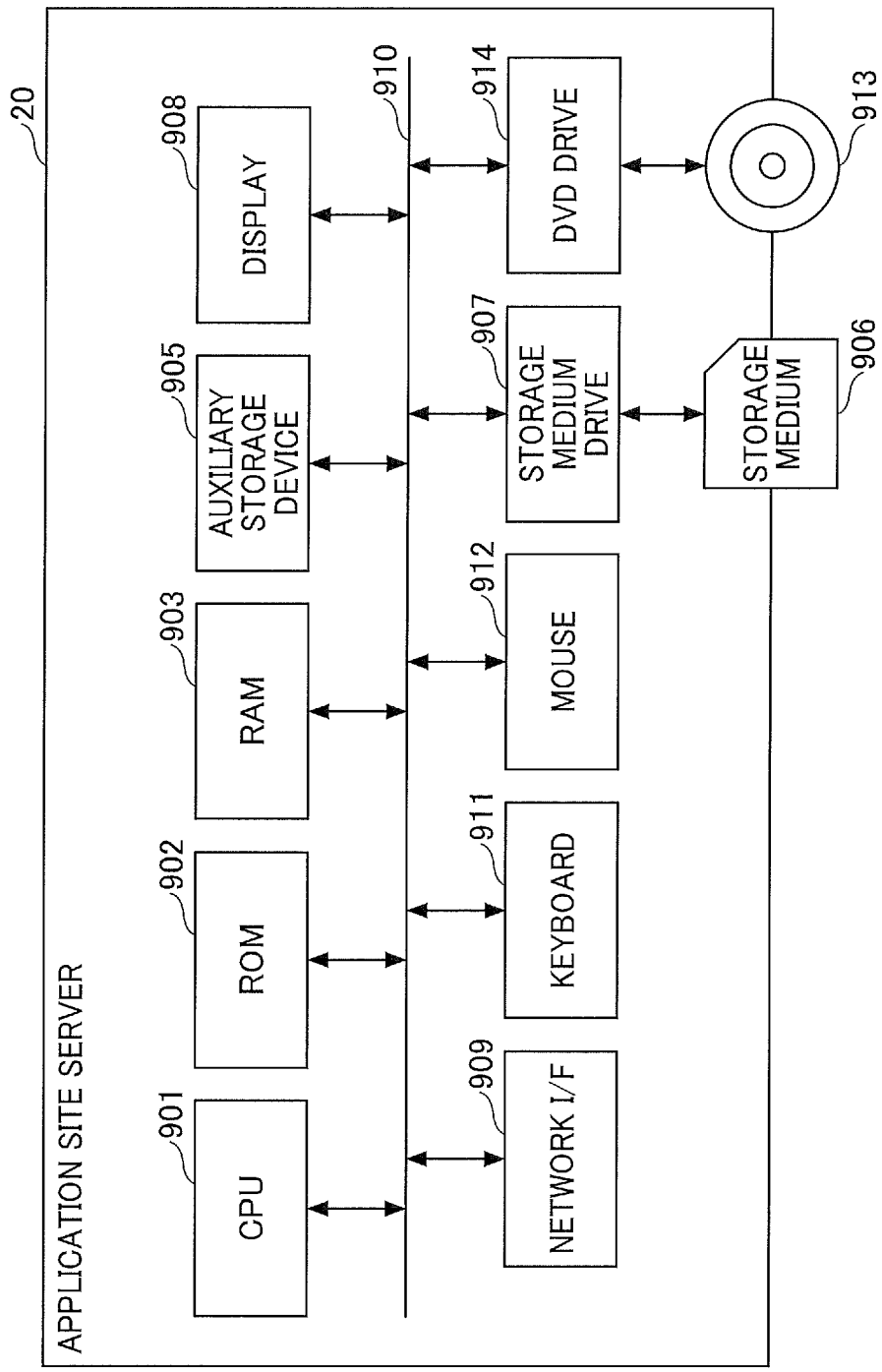
FIG. 3 is a block diagram illustrating an example of a hardware configuration of an application site server according to embodiments of the present disclosure.

The application site server 20 illustrated in FIG. 1 is implemented by, for example, a computer having a hardware configuration illustrated in FIG. 3. FIG. 3 is a block diagram illustrating an example of the hardware configuration of the application site server according to embodiments of the present disclosure.

The application site server 20 of FIG. 3 includes a CPU 901, a ROM 902, a RAM 903, an auxiliary storage device 905, a display 908, a network I/F 909, a keyboard 911, a mouse 912, a storage medium drive 907, and a Digital Versatile Disc (DVD) drive 914.

The CPU 901 is an arithmetic unit that controls the operation of the entire application site server 20. The ROM 902 is a non-volatile storage device that stores a program for the application site server 20. The RAM 903 is a volatile storage device used as a work area of the CPU 901.

The auxiliary storage device 905 is a storage device such as the HDD or SSD that stores a plurality of applications or firmware that can be installed in the MFP 10. The storage medium drive 907 is a device that controls reading and writing of data to a storage medium 906 such as a flash memory according to the control of the CPU 901.

The display 908 is a display device implemented by the LCD, the organic EL, or the like that displays various information such as a cursor, a menu, a window, characters, or an image. The network I/F 909 is an interface for communicating data with the external device such as the MFP 10 by using the network N. The network I/F 909 is, for example, a network interface card (NIC) or the like that supports ETHERNET and is capable of communication conforming to TCP/IP or the like.

The keyboard 911 is an input device for selecting characters, numbers, various instructions, moving a cursor, and the like. The mouse 912 is an input device for selecting and executing various instructions, selecting a processing target, moving a cursor, and the like.

The DVD drive 914 is a device that controls reading and writing of data to a DVD 913 such as a digital versatile disc read only memory (DVD-ROM) or a digital versatile disc recordable (DVD-R) as an example of a removable storage medium.

The CPU 901, ROM 902, RAM 903, auxiliary storage device 905, display 908, network I/F 909, keyboard 911, mouse 912, storage medium drive 907, and DVD drive 914 communicate through a bus line 910 such as an address bus and a data bus.

The hardware configuration of the application site server 20 illustrated in FIG. 3 is an example, and all the components illustrated in FIG. 3 may not be included, or the components other than the components illustrated in FIG. 3 may be included.

Figure 4:
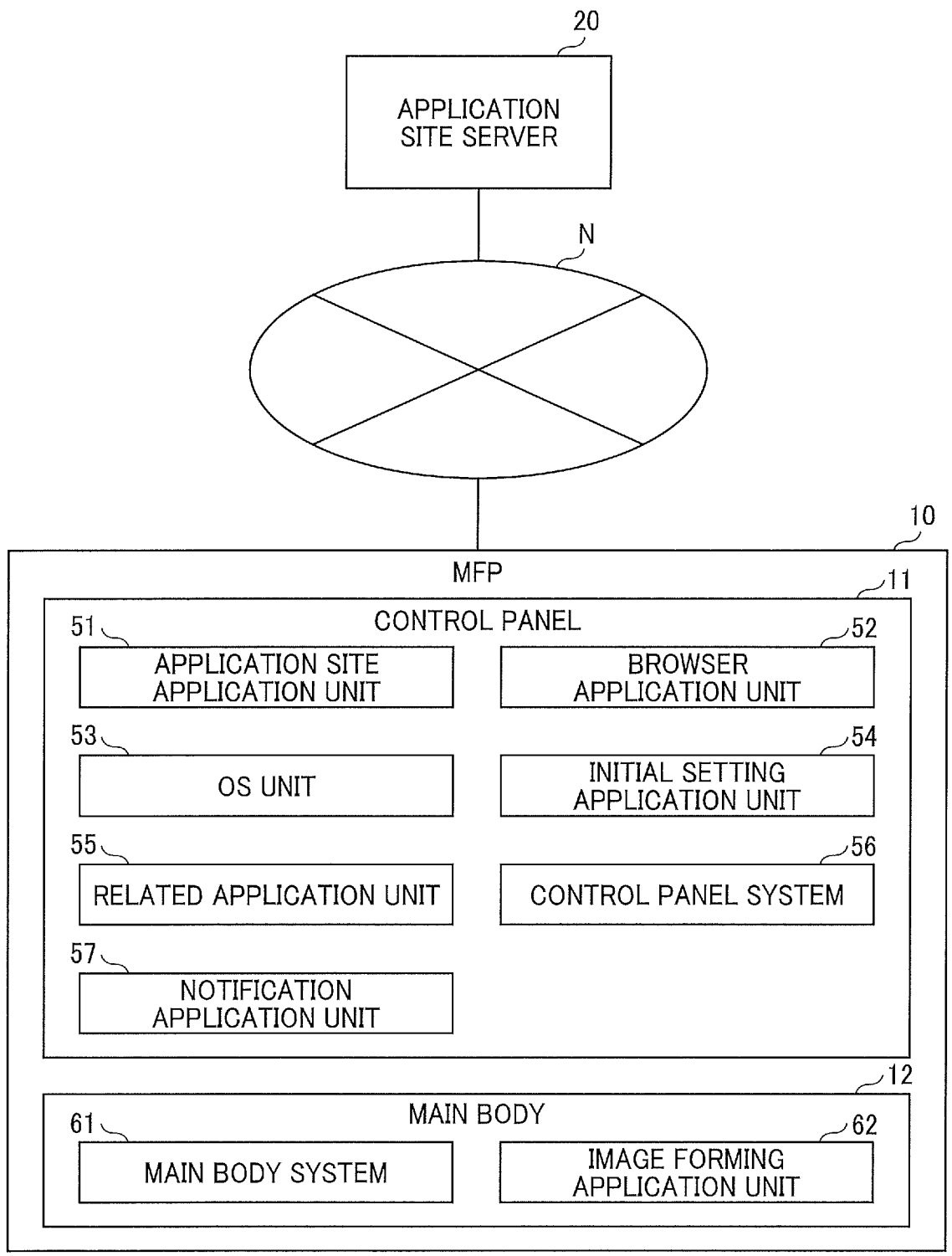
FIG. 4 is a block diagram illustrating an example of a functional configuration of the information processing system according to embodiments of the present disclosure.

The information processing system 1 according to the present embodiment is implemented, for example, by a functional configuration illustrated in FIG. 4. FIG. 4 is a block diagram illustrating the functional configuration of the information processing system according to the present embodiment. The functional configuration of FIG. 4 omits components unnecessary for the description of the present embodiment as appropriate.

As illustrated in FIG. 4, the control panel 11 includes an application site application unit 51, a browser application unit 52, an OS unit 53, an initial setting application unit 54, a related application unit 55, a control panel system 56, and a notification application unit 57. The control panel 11 implements, for example, the functional configuration illustrated in FIG. 4 by executing a program such as the OS or the application.

The application site application unit 51 is implemented by the CPU 811 of the control panel 11 using the RAM 813 as the work area to execute processing according to the application site application. The application site application unit 51 communicates with the application site provided by the application site server 20 through the browser application unit 52 and provides a function of downloading an application or firmware according to a user's operation.

The browser application unit 52 is implemented by the CPU 811 of the control panel 11 using the RAM 813 as the work area to execute processing according to the browser application. The browser application unit 52 implements a function such as a web application by acquiring web contents from the application site server 20. Web contents are, for example, various electronic files described in HyperText Markup Language (HTML), Cascading Style Sheets (CSS), JAVASCRIPT (registered trademark), and the like.

The OS unit 53 is implemented by the CPU 811 of the control panel 11 using the RAM 813 as the work area to execute processing according to the OS such as ANDROID (registered trademark). The OS unit 53 implements OS functions including a function of executing application installation, a function of instructing the initial setting application unit 54, the related application unit 55, and the like to set setting information described below.

The initial setting application unit 54 is implemented by the CPU 811 of the control panel 11 using the RAM 813 as the work area to execute processing according to the initial setting application. The initial setting application unit 54 implements a function of setting the setting information according to the instruction from the OS unit 53.

The related application unit 55 is implemented by the CPU 811 of the control panel 11 using the RAM 813 as the work area to execute processing according to a related application. The related application unit 55 implements a function of setting the setting information according to the instruction from the OS unit 53. The control panel system 56 is implemented by the CPU 811 of the control panel 11 using the RAM 813 as the work area and executing processing according to a program that controls the operation of the control panel 11 other than the functions implemented by the browser application unit 52. The control panel system 56 is implemented by a command from the CPU 811 of the control panel 11, the operation panel 815, and the like.

The notification application unit 57 is implemented by the CPU 811 of the control panel 11 using the RAM 813 as the work area to execute processing according to a notification application. The notification application unit 57 communicates with the application site provided by the application site server 20 through the browser application unit 52 and provides a "notification function" which is a function of notifying the user of information on the application and firmware.

Further, as illustrated in FIG. 4, the main body 12 includes a main body system 61 and an image forming application unit 62. The main body 12 implements, for example, the functional configuration of FIG. 4 by executing software that controls hardware such as the firmware.

The main body system 61 is implemented by the CPU 821 of the main body 12 using the RAM 823 as the work area to execute a process according to a program that controls the operation of the main body 12 such as the firmware.

The image forming application unit 62 is implemented by the CPU 821 of the main body 12 using the RAM 823 as the work area to execute processing according to the image forming application. The image forming application unit 62 is implemented by a command from the CPU 821 of the main body 12, the scanner 825, the printer 826, and the like. The image forming application unit 62 implements a function of controlling an operation of an image forming engine. The image forming application includes a copy application, a scan application, a facsimile application, a print application and the like.

Figure 5:
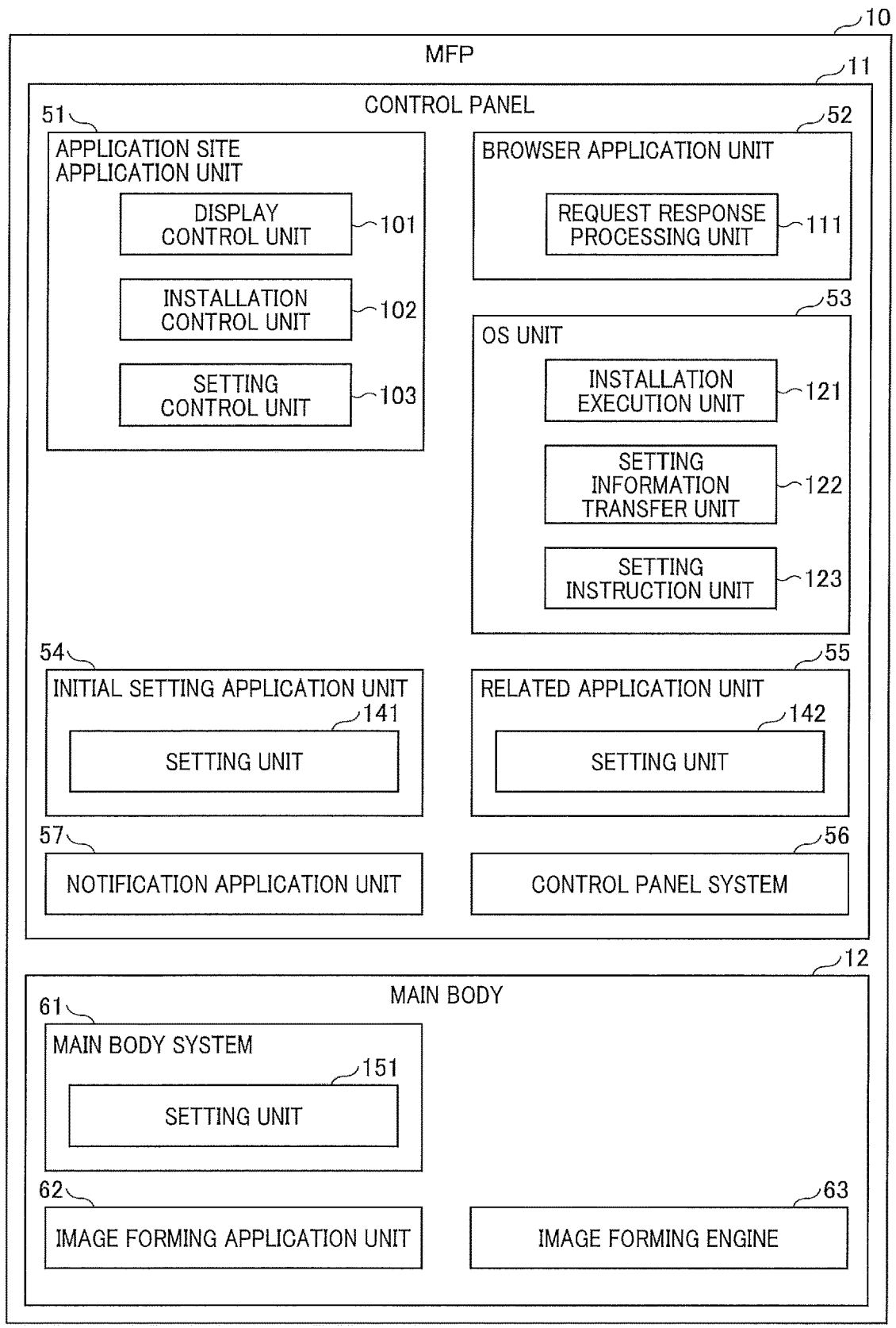
FIG. 5 is a block diagram illustrating an example of a detailed functional configuration of the information processing system according to embodiments of the present disclosure.

The details of the functional configuration illustrated in FIG. 4 are as illustrated in FIG. 5, for example. FIG. 5 is a block diagram illustrating an example of a detailed functional configuration of the information processing system according to embodiments of the present disclosure. The functional configuration of FIG. 5 omits components unnecessary for the description of the present embodiment as appropriate.

As illustrated in FIG. 5, the application site application unit 51 of the control panel 11 includes a display control unit 101, an installation control unit 102, and a setting control unit 103. The display control unit 101 causes the operation panel 815 to display a web page or the like corresponding to contents such as an application list and an installation screen acquired from the application site server 20. Further, the display control unit 101 causes the operation panel 815 to display the generated contents such as the setting screen.

For example, the display control unit 101 requests list information of applications and firmware that can be installed in the MFP 10 in response to the user's operation input to the operation panel 815 and displays the application list on the operation panel 815 based on the list information received as a response. Further, the display control unit 101 requests an installation screen of the application and the firmware that can be installed on the MFP 10 in response to the user's operation input to the operation panel 815 and displays the installation screen on the operation panel 815 based on the installation screen received as a response.

The installation control unit 102 requests the application site server 20 to acquire the application or firmware in response to the user's operation input to the operation panel 815 instructing the application or firmware to be installed, and installs the application or firmware received as a response.

The setting control unit 103 acquires the setting information described below and displays the setting screen described below generated based on the setting information on the operation panel 815. Further, in response to the user's input operation to the operation panel 815, the setting control unit 103 instruct to set the setting values of various setting items entered on the setting screen and sets various setting items in the initial setting application unit 54, the related application unit 55, the main body system 61, and the like.

As illustrated in FIG. 5, the browser application unit 52 of the control panel 11 includes a request response processing unit 111. The request response processing unit 111 makes a request to the application site server 20 in response to an instruction from, for example, the application site application unit 51. Further, the request response processing unit 111 transfers, for example, the response from the application site server 20 to the application site application unit 51.

Further, as illustrated in FIG. 5, the OS unit 53 of the control panel 11 includes an installation execution unit 121, a setting information transfer unit 122, and a setting instruction unit 123. The installation execution unit 121 executes an installation process of the application acquired from the application site server 20. The setting information transfer unit 122 transfers the acquired setting information to the application site application unit 51 as described below.

The setting instruction unit 123 receives an instruction for setting the setting values of various setting items from the application site application unit 51 and instructs the initial setting application unit 54, the related application unit 55, the main body system 61, and the like to set the setting values of various setting items.

Further, as illustrated in FIG. 5, the initial setting application unit 54 of the control panel 11 includes a setting unit 141. The related application unit 55 of the control panel 11 includes a setting unit 142. The setting units 141 and 142 set the settings according to the setting instruction of the setting information from the setting instruction unit 123 of the OS unit 53. Further, as illustrated in FIG. 5, the main body system 61 of the main body 12 includes a setting unit 151. The setting unit 151 sets the settings according to the instruction for setting the setting information from the setting control unit 103 of the application site application unit 51.

The configuration of each functional unit of the control panel 11 and the main body 12 of the MFP 10 illustrated in FIGS. 4 and 5 is an example and is not limited to the configuration of FIGS. 4 and 5. For example, a plurality of functional units illustrated as independent functional units of the MFP 10 in FIGS. 4 and 5 may be configured as one functional unit. Further, the functional unit illustrated as one functional unit of the MFP 10 in FIGS. 4 and 5 may be divided into a plurality of functional units.

Further, in the control panel 11, the functional unit implemented by the browser application unit 52 and the functional unit implemented by the control panel system 56 may not be distinguished and the functional unit implemented by the browser application unit 52 may be implemented by the control panel system 56, or vice versa.

The functions of the application site server 20 according to the present embodiment includes a function of generating and sending to the MFP 10, the list information of applications and firmware that can be installed in the MFP 10 in response to a request for the list information. The functions of the application site server 20 according to the present embodiment includes a function of sending the information of various screens to the MFP 10 in response to a screen request from, for example, the MFP 10.

The functions of the application site server 20 according to the present embodiment includes a function of storing the application, various firmware programs, a package combining these applications and programs, and the like in a storage unit such as the auxiliary storage device 905 of FIG. 3. The functions of the application site server 20 according to the present embodiment may include a function of storing the application, various firmware programs, the package combining these applications and programs, and the like in a storage unit capable of communicating through the network N.

FIGS. 6A to 10 are diagrams illustrating an example of screen transition. With reference to FIGS. 6A to 10, the screen transition to a setting screen 1400 described below is described. As illustrated in FIG. 6A, a home screen 1000 displayed on the operation panel 815 of the MFP 10 includes an application site button 1002 and a widget 1003. The application site button 1002 is a button for displaying a list screen 1200 described below, which displays a list of applications and firmware that can be installed on the MFP 10. The widget 1003 is a button for displaying a notification dialog box 1500 on the operation panel 815.

The widget 1003 is an example of a button including a display area for displaying the latest information of the MFP 10. The widget 1003 in FIG. 7A displays "NEW SOFTWARE UPDATE IS AVAILABLE" and notifies the user that some software can be updated. As illustrated in FIG. 6A, the home screen 1000 includes in addition to the application site button 1002 and the widget 1003, for example, a copy button for executing a copy process, a scan button for executing a scan process, and a facsimile button for executing a facsimile process.

For example, the control panel 11 displays the notification dialog box 1500 on the operation panel 815 in response to pressing of the widget 1003 by the user. The notification dialog box 1500 is a screen that displays specifically what application or firmware can be installed.

Figure 6B:
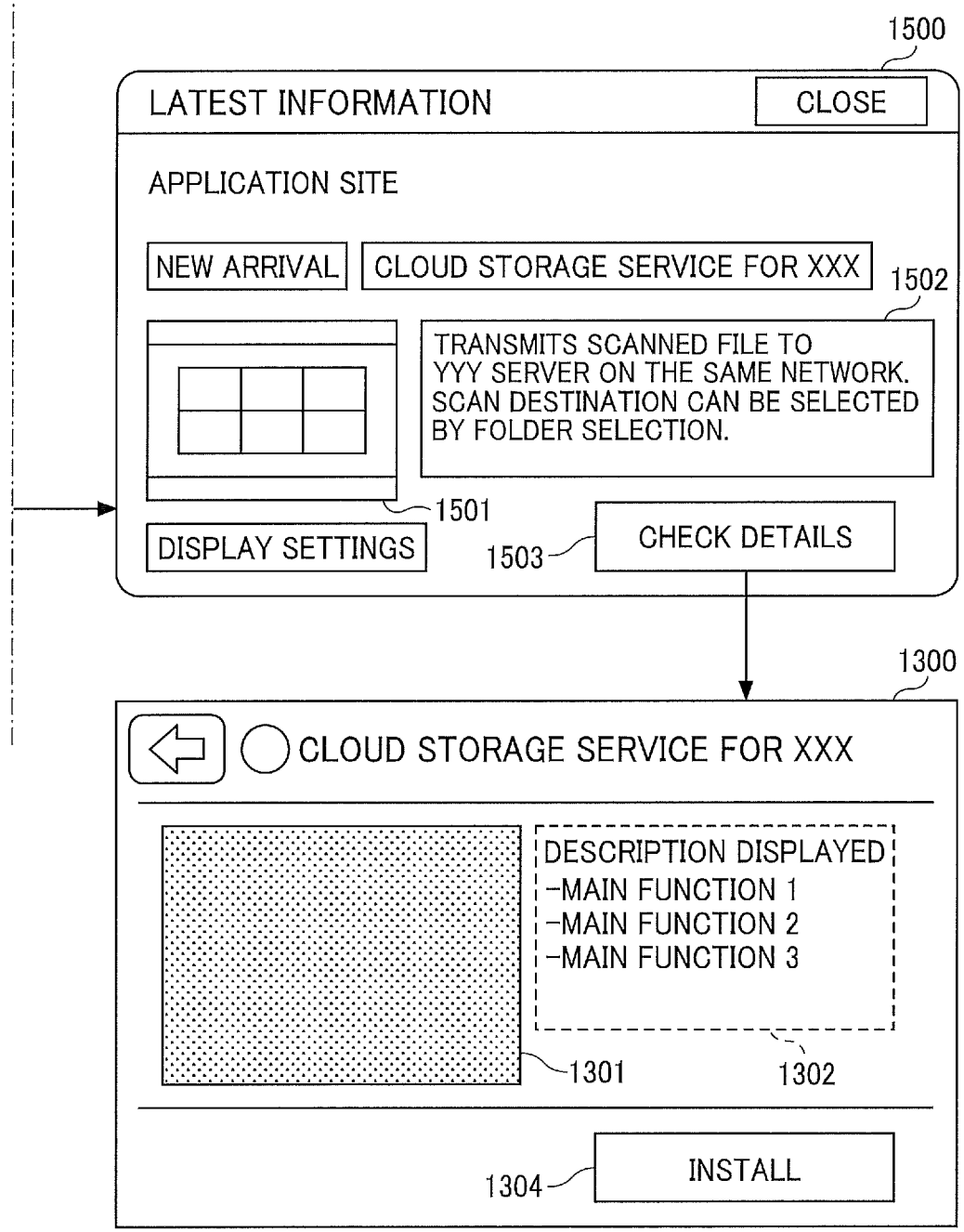

As illustrated in FIG. 6B, the notification dialog box 1500 includes a screenshot display area 1501, a description display area 1502, and a check details button 1503. For example, the notification dialog box 1500 illustrated in FIG. 6B displays an application "CLOUD STORAGE SERVICE FOR XXXX".

The screenshot display area 1501 displays a screenshot or the like of the application displayed by the notification dialog box 1500 operating. The description display area 1502 displays the description of the operation of the application displayed by the notification dialog box 1500. The check details button 1503 is a button for displaying an installation screen 1300 for performing installation of the application displayed by the notification dialog box 1500.

For example, as illustrated in FIG. 6B, in response to a pressing of the check details button 1503 by the user to install the application "CLOUD STORAGE SERVICE FOR XXXX", the control panel 11 displays the installation screen 1300 for installing the application "CLOUD STORAGE SERVICE FOR XXXX" on the operation panel 815.

As illustrated in FIG. 6B, the installation screen 1300 includes a screenshot display area 1301, a description display area 1302, and an installation button 1304 for performing the installation process. The screenshot display area 1301 displays a screenshot or the like of a screen indicating the application displayed by the notification dialog box 1500 operating. The description display area 1302 displays a description of a specific function of the application displayed by the notification dialog box 1500.

As described above, the user can confirm the functions of the application or firmware described on each screen by confirming the notification dialog box 1500 and the installation screen 1300. Then, the user can determine whether to install the application or firmware described on each screen after confirming the function of the application or firmware described on each screen.

Then, the user presses the installation button 1304 in order to install the application "CLOUD STORAGE SERVICE FOR XXXX". In response to a pressing of the installation button 1304, the control panel 11 generates and displays the setting screen 1400 described below on the operation panel 815 after installing the application "CLOUD STORAGE SERVICE FOR XXXX".

That is, after installing the application "CLOUD STORAGE SERVICE FOR XXXX", the user can set the setting values of various setting items from the setting screen 1400 displayed on the operation panel 815. In the case the user does not install the application "CLOUD STORAGE SERVICE FOR XXXX", the user can return to the display of the notification dialog box 1500 by pressing a back button or the like on the installation screen 1300.

As illustrated in FIG. 6B, after installing the application or firmware according to the installation instruction from the user, the MFP 10 displays the setting screen 1400 described below on the operation panel 815, for setting the setting values of various setting items for using the installed application or firmware.

Accordingly, the user can avoid forgetting to set the setting values of various setting items for using the installed application or firmware and in addition, the setting values of various setting items can be easily set from the setting screen 1400. As described above, according to the present embodiment, it is possible to improve the convenience of the user who sets the setting values of various setting items for using the installed application or firmware.

Figure 7B:
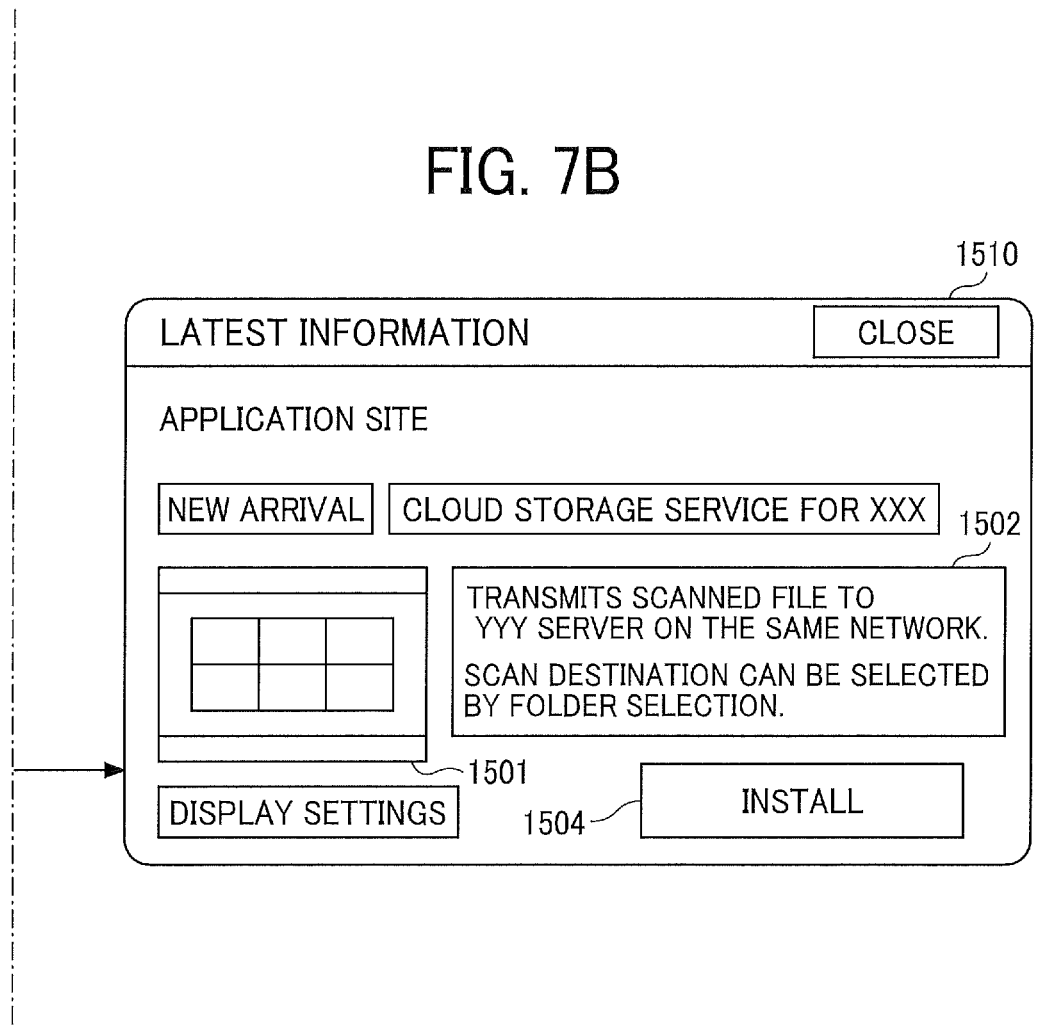

In the screen transition of FIG. 6B, an example in which the installation button 1304 is provided on the installation screen 1300 is illustrated, but as illustrated in FIG. 7B, the installation button 1304 may be provided in the notification dialog box 1500.

For example, the control panel 11 displays the notification dialog box 1510 on the operation panel 815, in response to the pressing of the widget 1003 of the home screen 1000 by the user. As illustrated in FIG. 7B, the notification dialog box 1510 includes a screenshot display area 1501, a description display area 1502, and an installation button 1504.

The user can instruct the control panel 11 to install the application "CLOUD STORAGE SERVICE FOR XXXX" by pressing the installation button 1504. The control panel 11 installs the application "CLOUD STORAGE SERVICE FOR XXXX" and generates and displays the setting screen 1400 described below, on the operation panel 815.

That is, after installing the application "CLOUD STORAGE SERVICE FOR XXXX", the user can set the setting values of various setting items from the setting screen 1400 displayed on the operation panel 815.

Further, FIGS. 6A, 6B, 7A, and 7B illustrate a screen transition for installing the application "CLOUD STORAGE SERVICE FOR XXXX" by pressing the widget 1003 of the home screen 1000 displayed on the operation panel 815 of the MFP 10. FIGS. 8A and 8B illustrate an example of installing the application "CLOUD STORAGE SERVICE FOR XXXX" from the home screen 1000 by a sequence different from the screen transition illustrated in FIGS. 6A, 6B, 7A, and 7B.

As illustrated in FIGS. 8A and 8B, in response to a pressing of the application site button 1002 of the home screen 1000 displayed on the operation panel 815 of the MFP 10 by the user, the control panel 11 displays a list screen 1200 displaying a list of a plurality of applications and firmware that can be installed on the MFP 10 on the operation panel 815. The list screen 1200 is a screen for displaying the list of the plurality of applications and firmware that can be installed on the MFP 10. The list screen 1200 includes a button for transitioning to the installation screen 1300 for installing each application, and a button for transitioning to the installation screen 1300 for installing each firmware. For example, the list screen 1200 of FIG. 8B includes a button 1201c for transitioning to the installation screen 1300 for installing the application "CLOUD STORAGE SERVICE FOR XXXX".

Then, the user presses the button corresponding to the application or firmware for which the installation screen 1300 is to be displayed from the list screen 1200 displayed on the control panel 11.

For example, in response to the user pressing the button 1201c corresponding to the application "CLOUD STORAGE SERVICE FOR XXXX", the control panel 11 displays the installation screen 1300 for installing the application "CLOUD STORAGE SERVICE FOR XXXX" on the operation panel 815. The installation screen 1300 of FIG. 8B is the same as the installation screen 1300 of FIG. 6B.

The user can instruct the control panel 11 to install the application "CLOUD STORAGE SERVICE FOR XXXX" by pressing the installation button 1304. The control panel 11 installs the application "CLOUD STORAGE SERVICE FOR XXXX" and generates and displays the setting screen 1400 described below, on the operation panel 815.

The user can set the setting values of various setting items on the setting screen 1400 displayed on the operation panel 815 after installing the application "CLOUD STORAGE SERVICE FOR XXXX".

Figure 9:
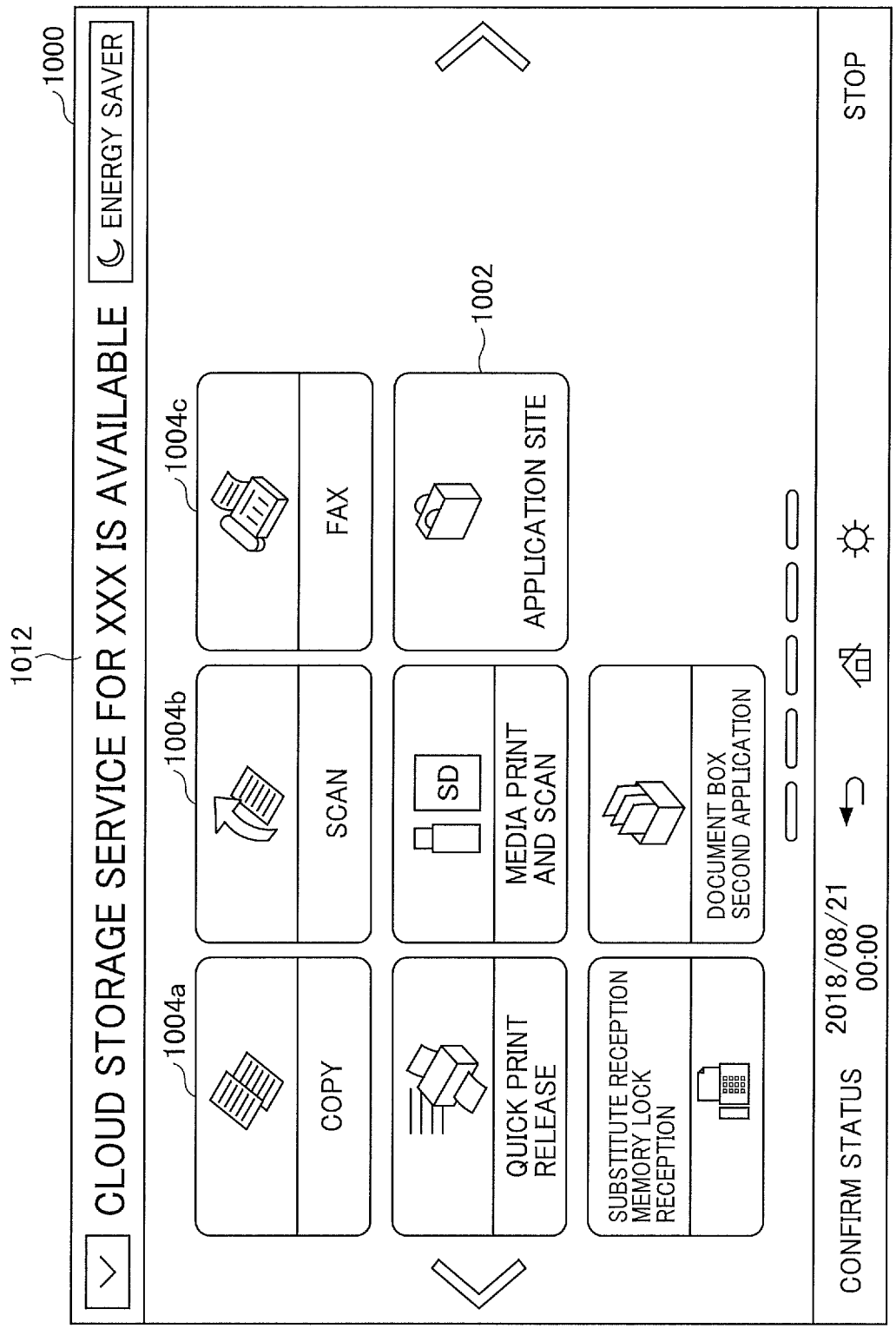
FIG. 9 is a diagram illustrating an example of the screen transition.
Figure 10:
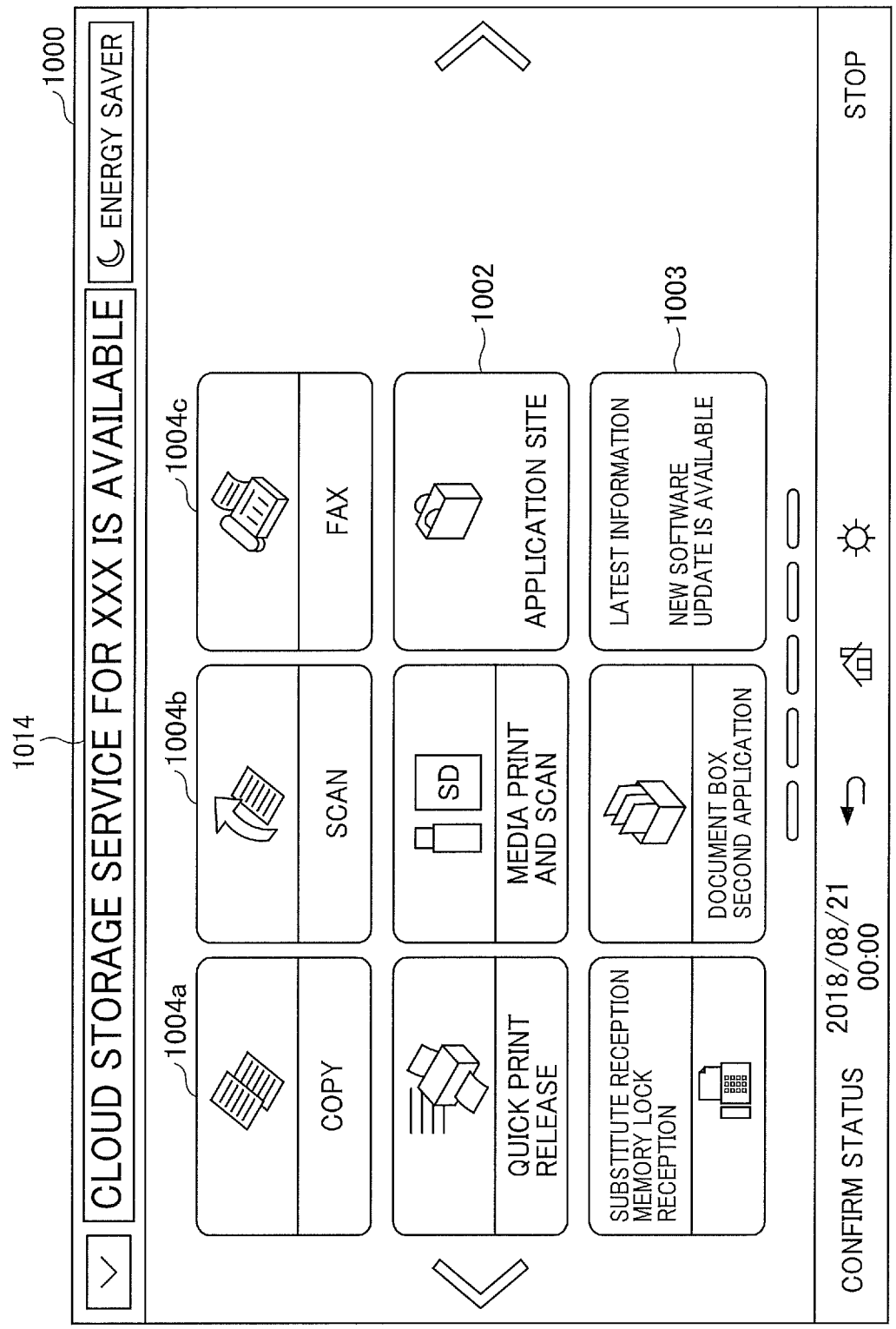
FIG. 10 is a diagram illustrating an example of the screen transition.

Further, the sequence of screen transition may be other than the screen transition illustrated in FIGS. 6A to 8B, and the screen transition may be made from the home screen 1000 as illustrated in FIG. 9 or FIG. 10, for example. FIG. 9 is an example in which the home screen 1000 includes a message 1012 with a link. The user can notice that the application "CLOUD STORAGE SERVICE FOR XXXX" can be used by reading the message 1012 with the link displayed on the home screen 1000 of FIG. 9. Further, the user can press the message 1012 with the link to display the installation screen 1300 on the operation panel 815.

FIG. 10 is an example in which the home screen 1000 includes a button 1014 with a message "CLOUD STORAGE SERVICE FOR XXXX IS AVAILABLE". By looking at the button 1014 with a message displayed on the home screen 1000 of FIG. 10, the user can notice that the application "CLOUD STORAGE SERVICE FOR XXXX" is available. Further, the user can press the button 1014 with the message to display the installation screen 1300 on the operation panel 815.

The user can set the setting values of various setting items on the setting screen 1400 displayed on the operation panel 815 after installing the application "CLOUD STORAGE SERVICE FOR XXXX".

For example, setting information as illustrated in FIG. 11 is used to generate the setting screen 1400. FIG. 11 is a table illustrating an example of setting information. FIG. 11 illustrates the setting information when "CLOUD STORAGE SERVICE FOR XXXX" is set as an installation target as an example of the setting information.

The setting information of FIG. 11 includes a setting type, a setting target, a setting item, an initial value, an input type, and an input restriction as data items. The setting information in FIG. 11 illustrates various setting items for using the application or firmware to be installed. As illustrated in FIG. 11, various setting items for using the application or firmware to be installed include the application or firmware not to be installed in addition to the application or firmware to be installed.

The setting targets of the setting information in FIG. 11 are the application or firmware to be installed that requires setting of the setting value in order to use the application or firmware to be installed and the application or firmware other than the installation target. The setting type is information indicating whether the application or firmware illustrated in the setting target is for the control panel 11 or the main body system 61 of the main body 12. The setting item indicates the name of the setting item. The initial value indicates the initial value of the setting item. The input type is information indicating an input method for receiving input of a set value from the user such as the administrator and indicates an input method such as a radio button, a text box, and a pull-down list.

The input restriction indicates the information required for the input method indicated by the input type. For example, when the input type is the radio button, the input restriction indicates a setting value that can be selected with the radio button, for example, "YES/NO". When the input type is the text box, the input restriction indicates setting values that can be input to the text box, for example, alphanumeric characters or numbers.

When the input type is the pull-down list, the input restriction indicates options that can be selected from the pull-down list. For example, in the example of FIG. 11, the name list of the address book, which is the item value of the "nameList" item of the address book application to be set, is acquired and displayed on the setting screen 1400 as a pull-down list option.

Figure 12:
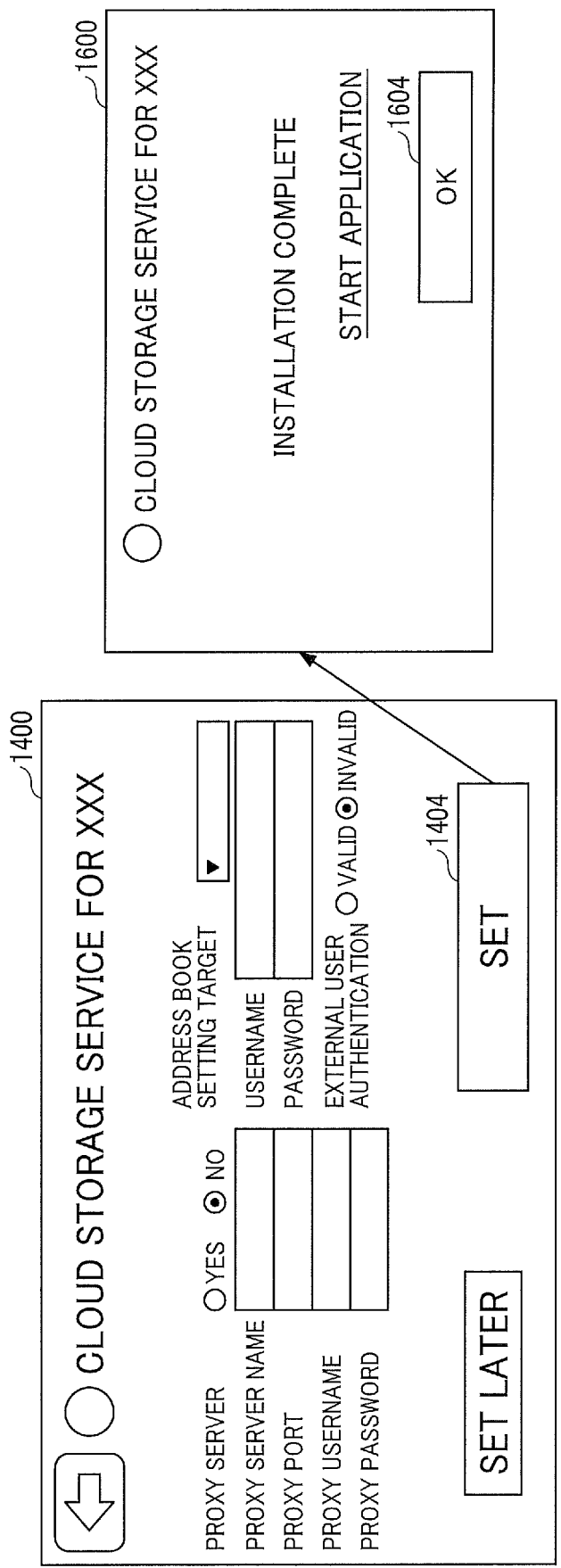
FIG. 12 is a diagram illustrating an example of a setting screen.

The application site application unit 51 refers to the setting information illustrated in FIG. 11 to generate a setting screen 1400 as illustrated in FIG. 12. The setting information illustrated in FIG. 11 may be acquired from the application or firmware to be installed or may be acquired from the application site server 20.

FIG. 12 is a diagram illustrating an example of the setting screen. The setting screen 1400 of FIG. 12 includes setting item names, initial values, input types, and input restrictions of the setting information illustrated in FIG. 11 and generated based on, for example, a screen template stored in the application site application unit 51. The screen template may be stored by a functional unit other than the application site application unit 51.

The user such as the administrator inputs setting values for various setting items for using "CLOUD STORAGE SERVICE FOR XXXX", which is an example of the application or firmware to be installed, to the setting screen 1400 in FIG. 12. Then, the user such as the administrator can set setting values for various setting items by pressing the setting button 1404 provided on the setting screen 1400.

After the setting values for various setting items are set, the application site application unit 51 displays the installation completion screen 1600 of FIG. 12 on the operation panel 815 and notifies the user such as the administrator of the completion of the installation and the setting. The display of the installation completion screen 1600 ends, for example, by pressing an OK button 1604.

Immediately after the installation of the application or firmware is completed, the function provided by the application or firmware may not be enabled. As a setting item for using such an application or firmware, the setting item for enabling a function provided by the application or firmware is displayed on the setting screen 1400 of FIG. 12. Then, the user such as the administrator can input to the setting screen of FIG. 12 for validating the setting value of the setting item.

As described above, according to the present embodiment, after the application or firmware is installed, the setting screen 1400 for making the settings for using the application or firmware is displayed and enables to prevent the user such as the administrator from forgetting the settings required to use the application or firmware.

Further, according to the present embodiment, since the setting values for various setting items for using the installed application or firmware can be input from the setting screen 1400, the convenience of the user such as the administrator is improved.

A process of the information processing system 1 according to the present embodiment is described. FIGS. 13A, 13B, 14A, and 14B are a sequence diagram illustrating an example of the process of the information processing system according to the present embodiment.

In step S1, for example, the user such as the administrator activates the application site application unit 51 by pressing the application site button 1002 of the home screen 1000 of FIG. 6A.

In step S2, the activated application site application unit 51 designates authentication information and device ID and instructs the browser application unit 52 to acquire list information. The list information is information indicating a list of a plurality of applications and firmware that can be installed on the MFP 10. In step S3, the browser application unit 52 designates the authentication information and the device ID and requests the application site server 20 for the list information.

In step S4, the application site server 20 uses the designated authentication information and device ID to generate the list information indicating the list of the plurality of applications and firmware that can be installed on the MFP 10. In step S5, the application site server 20 transmits the list information to the browser application unit 52.

In step S6, the browser application unit 52 transfers the list information transmitted from the application site server 20 to the application site application unit 51. In step S7, the application site application unit 51 displays the list of the plurality of installable applications and firmware on the list screen 1200 of FIG. 8B, for example, based on the transferred list information.

In step S8, the user such as the administrator presses a button corresponding to the application or firmware to display the installation screen 1300 from the list screen 1200 displayed on the control panel 11 (operation for selecting an application or firmware).

In step S9, the application site application unit 51 designates the application or firmware selected by the user such as the administrator by the application ID or the like and instructs the browser application unit 52 to acquire the installation screen 1300. In step S10, the browser application unit 52 designates the application ID and the like and requests the application site server 20 for the installation screen. In step S11, the application site server 20 transmits the installation screen data to the browser application unit 52.

In step S12, the browser application unit 52 transfers the installation screen data transmitted from the application site server 20 to the application site application unit 51. In step S13, the application site application unit 51 displays, for example, the installation screen 1300 of FIG. 8 on the operation panel 815, based on the transferred installation screen data.

In step S14, the user such as the administrator presses the installation button 1304 of the installation screen 1300 displayed on the control panel 11 to instruct the installation to the application site application unit 51.

In step S15, the application site application unit 51 designates the application ID or the like of the application or firmware to be installed and instructs the browser application unit 52 to acquire the application or firmware. In step S16, the browser application unit 52 designates the application ID and the like and requests the application site server 20 to acquire the application or firmware. In step S17, the application site server 20 transmits the application or firmware designated by the application ID or the like to the browser application unit 52.

In step S18, the browser application unit 52 stores the application or firmware transmitted from the application site server 20. In step S19, the browser application unit 52 notifies the application site application unit 51 of the completion of the acquisition of the application or the firmware.

Figure 14B:
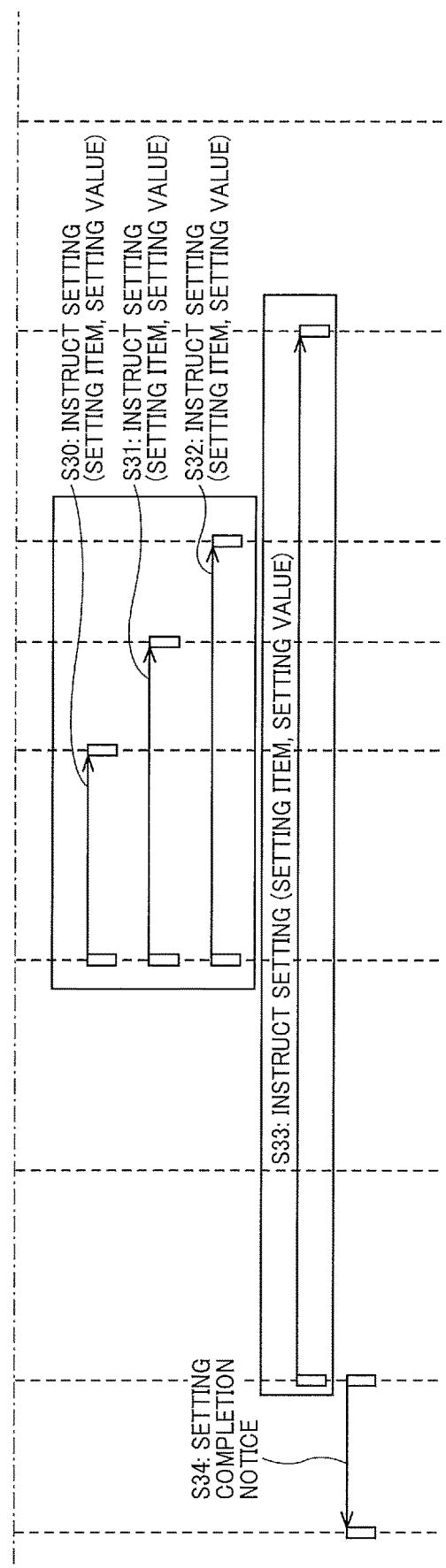

In step S20, the application site application unit 51 instructs the OS unit 53 to install the application or firmware that has been acquired. In step S21, the OS unit 53 executes the installation process of the application or firmware stored in step S18. FIGS. 14A and 14B illustrates an example in which a new application is installed. In step S22, the OS unit 53 notifies the application site application unit 51 of the completion of the installation of the application or firmware that has been acquired.

In step S23, the installed new application transmits the setting information as illustrated in FIG. 11 indicating various setting items to use the OS unit 53. In step S24, the OS unit 53 transfers the setting information transmitted from the new application to the application site application unit 51.

In the processing of steps S23 to S24, the setting information is transferred between the new application and the application site application by using an intent function of the OS unit 53. The intent function is one of the functions of ANDROID, which is an example of the OS, and is a mechanism to take over the processing between applications.

The process of acquiring the setting information by the application site application unit 51 executed in steps S23 to S24 is an example, and various other methods can be used. For example, the application site application unit 51 may acquire setting information from a new application. Further, the application site application unit 51 may acquire the setting information from the installer of the new application. Further, the application site application unit 51 may acquire the setting information managed by the application site server 20 in association with the application ID and the like by the processes of steps S9 to S12 and the processes of steps S15 to S19.

In step S25, the application site application unit 51 determines whether to perform the setting for using the installed application or firmware by referring to the setting information as illustrated in FIG. 11. FIGS. 14A and 14B illustrates a case where it is determined that the setting is to be performed to use the installed application or firmware.

In step S26, the application site application unit 51 generates the setting screen 1400 as illustrated in FIG. 12 based on the setting information as illustrated in FIG. 11. In step S27, the application site application unit 51 displays the setting screen 1400 as illustrated in FIG. 12 on the operation panel 815.

In step S28, the user such as the administrator inputs setting values for various setting items for using the installed application or firmware on the setting screen 1400 of FIG. 12 and instructs the setting of the setting value for various setting items by pressing the setting button 1404.

In step S29, the application site application unit 51 designates setting items and setting values and instructs the OS unit 53 to configure the setting items with the setting values. The process of step S29 is repeated for each setting target of the "control panel application" whose setting type is in the setting information of FIG. 11.

In step S30, the OS unit 53 designates setting items and setting values to the initial setting application unit 54, which is one of the setting targets, and instructs the setting. The initial setting application unit 54 sets the set value in the setting item according to the instruction from the OS unit 53.

In step S31, the OS unit 53 designates setting items and setting values for a new application that is one of the setting targets and instructs the application to configure the setting items with the setting values. The installed new application sets the set value in the setting item according to the instruction from the OS unit 53.

Further, in step S32, the OS unit 53 designates setting items and setting values to the related application unit 55, which is one of the setting targets, and instructs the setting. The related application unit 55 sets the set value in the setting item according to the instruction from the OS unit 53.

The processing of steps S29 to S32 uses the intent function of the OS unit 53 to take over the processing of setting the setting value in the setting item for the application to be set from the application site application unit 51. In the setting information of FIG. 11, in the case there is no setting target of the setting type "control panel application", the processes of steps S29 to S32 are not performed.

In step S33, the application site application unit 51 designates setting items and setting values and instructs the setting to the main body system 61. The main body system 61 sets the set value in the setting item according to the instruction from the application site application unit 51.

In the process of step S33, the application site application unit 51 instructs the main body system 61 to set by calling an application programming interface (API) of the main body system 61. By calling the API of the main body system 61, the application site application unit 51 can instruct the main body system 61 to set the setting item that cannot be instructed through the new application installed in the control panel 11. The application site application unit 51 may call the API of the main body system 61 and instruct the main body system 61 to set a setting item that can be set through a new application installed in the control panel 11. The process of step S33 is not performed when there is no setting target of the setting type "main body system" in the setting information of FIG. 11.

After setting the setting values for various setting items, in step S34, the application site application unit 51 displays the installation completion screen 1600 as illustrated in FIG. 12 on the operation panel 815 and notifies the user such as the administrator that the installation and setting are completed.

Figure 15B:
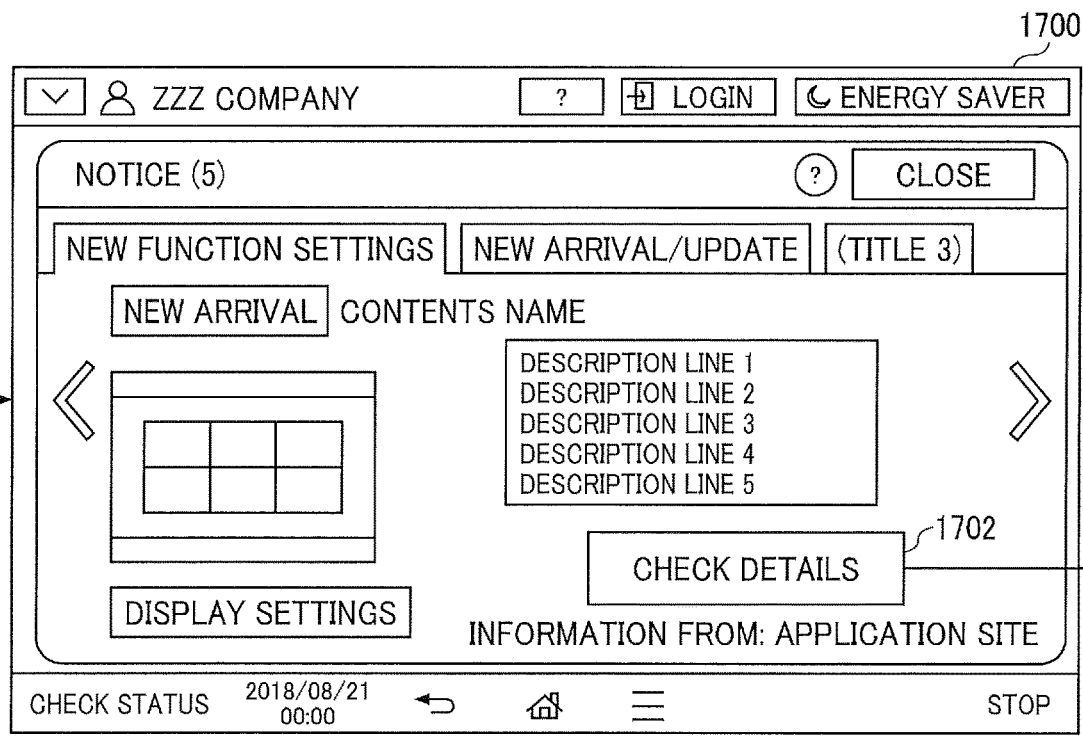
Figure 15C:
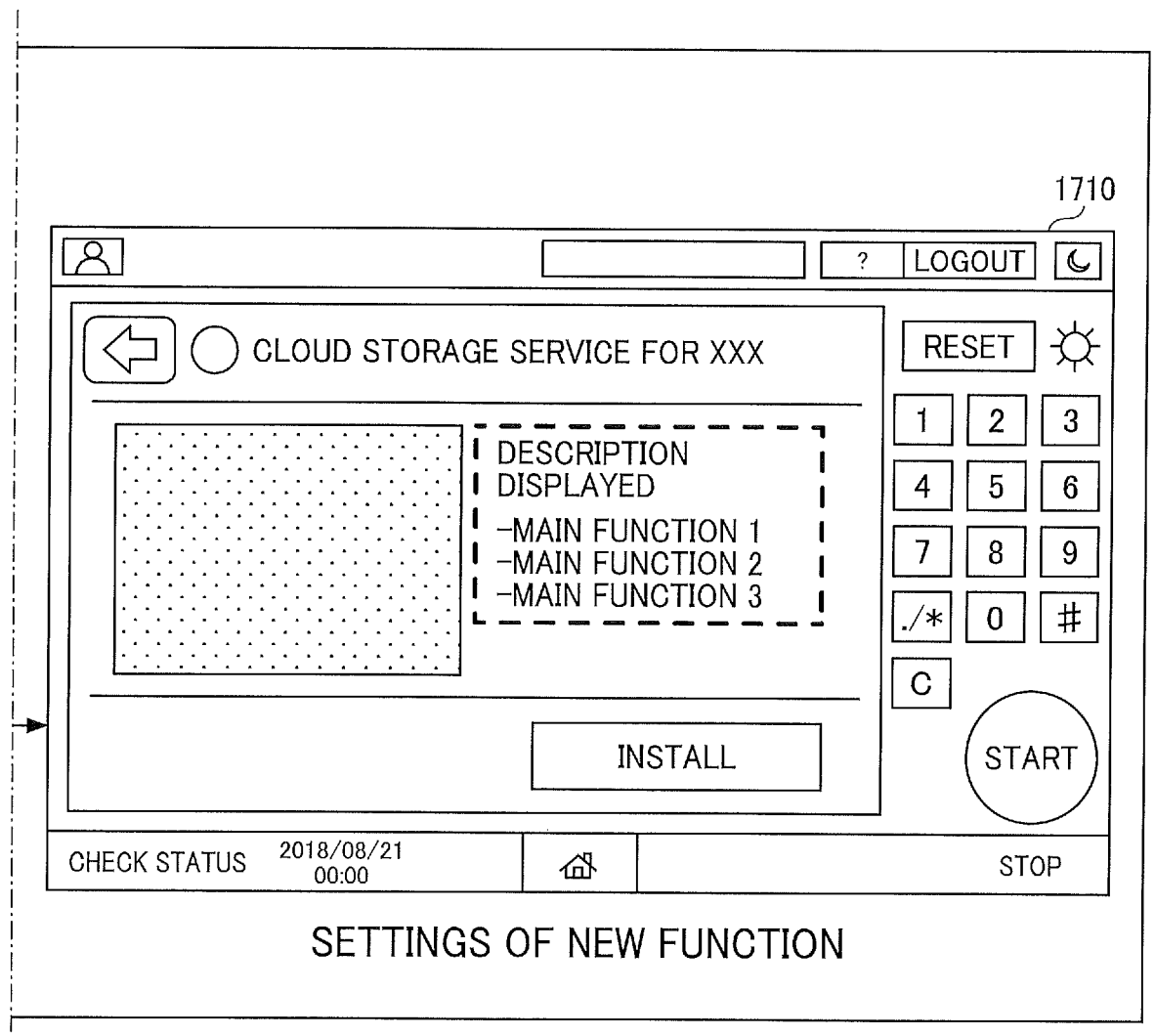

The notification dialog box 1500 displayed in response to the pressing of the widget 1003 illustrated in FIG. 6B or the like is an example, and the screen as illustrated in FIG. 15B, for example, may be displayed.

FIGS. 15A, 15B, 15C, and 15D are diagrams illustrating an example of the screen transition in response to the pressing of the widget on the home screen. For example, in response to a pressing by the user of the widget 1003 of the home screen 1000, the control panel 11 displays any of the screens 1700 to 1730 including notification dialog box on the operation panel 815. In FIGS. 15A to 15D, the application or firmware is displayed as a function.

In the case there is notification information other than the setting of the new function, the application site application unit 51 displays a screen 1700 that includes tabs to switch between the notification information of the setting of the new function and the notification information other than the setting of the new function on the operation panel 815. By pressing a check details button 1702 on the screen 1700, the user can display the screen 1710 including the information on the installation screen 1300 as illustrated in FIG. 6B on the operation panel 815.

In the case there is no notification information other than the setting of the new function, the application site application unit 51 displays the screen 1720 displaying the notification information on setting of the new function on the operation panel 815. By pressing a check details button 1722 on the screen 1720, the user can display the screen 1710 including the information on the installation screen 1300 as illustrated in FIG. 6B on the operation panel 815. In the case there is no notification information, the application site application unit 51 displays a screen 1730 without notification information for setting a new function on the operation panel 815.

In the screen transition of FIGS. 15A to 15D, the application site application unit 51 determines which of the screens 1700 to 1720 is to be displayed on the operation panel 815 by the process as illustrated in FIGS. 16A and 16B, for example.

In step S100, the application site application unit 51 acquires a list of applications or firmware installed in the MFP 10. The application site application unit 51 performs the process of steps S102 to S106 for each application or firmware included in the list.

In step S102, the application site application unit 51 determines whether the application or firmware to be processed is included in the list acquired in step S100. In the case the list acquired in step S100 includes the application or firmware to be processed, the application site application unit 51 proceeds to step S106 and determines to display the application or firmware to be processed on a new tab.

In the case the list acquired in step S100 does not include the application or firmware to be processed, the application site application unit 51 proceeds to step S104 and determines to display the application or firmware to be processed on a general tab. Information 200 stored for each application or firmware is referred to for the determination in step S102. The information 200 includes information on version and whether the application or firmware is a new function.

When the processing of steps S102 to S106 for the application or firmware included in the list information is completed, the application site application unit 51 performs the processing of step S108 and after.

In step S108, the application site application unit 51 determines whether the application or firmware included in the list acquired in step S100 is included in the list information and whether there is notification information other than the setting of the new function.

In the case the application or firmware included in the list acquired in step S100 is included in the list information and notification information other than the setting of the new function exists, the application site application unit 51 determines to display the tab in step S112 and display the screen 1700 on the operation panel 815. In the case the application or firmware included in the list acquired in step S100 is not included in the list information and the notification information other than the setting of the new function does not exist, the application site application unit 51 determines not to display the tab in step S110 and displays the screen 1710 or 1720 on the operation panel 815.

The apparatuses described in the examples are merely an illustration of one of several computing environments for implementing the embodiments disclosed herein. The present disclosure, however, is not limited to the present embodiments, and the constituent elements of the present embodiments include elements that can be easily conceived by those skilled in the art, those being substantially the same ones, and those being within equivalent ranges. Further, various omissions, substitutions, changes and combinations of components can be made without departing from the gist of the present embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image forming apparatus comprising:
   circuitry configured to:
   install an application;
   display, in response to completion of the installation of the application, on a control panel, a screen for receiving input of a setting value for a setting item based on setting information that includes one or more setting items for executing the installed application; and
   control to set the setting value for the setting item received on the screen,
   wherein the one or more setting items are associated with a setting type that indicate a control panel application or a main body system, and
   wherein the circuitry is configured to:
   in response to the setting type indicating the control panel application, instruct the setting of the setting value for the setting item employing an application program interface (API); and
   in response to the setting type indicating the main body system, instruct the setting of the setting value for the setting item employing an intent function of an operating system.

2. The image forming apparatus of claim 1, wherein the circuitry is further configured to acquire the setting information from the installed application.

3. The image forming apparatus of claim 1, wherein the circuitry is further configured to acquire the setting information from an installer of the installed application.

4. The image forming apparatus of claim 1, wherein the circuitry is further configured to acquire the setting information associated with the installed application from an information processing apparatus that provided the application to the image forming apparatus.

5. The image forming apparatus of claim 1, wherein the circuitry is further configured to acquire the application from an information processing apparatus.

6. The image forming apparatus of claim 1, wherein the setting information includes information on names of one or more setting items, initial values, input types, and input restrictions for each setting target.

7. The image forming apparatus of claim 1, wherein the circuitry is configured to instruct the application to configure the setting item with the setting value, and wherein the application sets the setting value in the setting item according to the instruction.

8. A setting method executed by an image forming apparatus, the method comprising:
   installing an application;
   displaying, in response to completion of the installation of the application, on a control panel, a screen for receiving input of a setting value for a setting item based on setting information that includes one or more setting items for executing the installed application; and
   controlling to set the setting value for the setting item received on the screen,
   wherein the one or more setting items are associated with a setting type that indicate a control panel application or a main body system, and
   wherein the method further comprises:
   instructing, in response to the setting type indicating the control panel application, the setting of the setting value for the setting item employing an application program interface (API); and
   instructing, in response to the setting type indicating the main body system, the setting of the setting value for the setting item employing an intent function of an operating system.

9. An information processing system comprising:
   an image forming apparatus; and
   an information processing apparatus configured to provide an application to the image forming apparatus, the image forming apparatus including circuitry configured to:
   install an application;
   display, in response to completion of the installation of the application, on a control panel, a screen for receiving input of a setting value for a setting item based on setting information that includes one or more setting items for executing the installed application; and
   control to set the setting value for the setting item received on the screen,
   wherein the one or more setting items are associated with a setting type that indicate a control panel application or a main body system, and
   wherein the circuitry is configured to:
   in response to the setting type indicating, instruct the setting of the setting value for the setting item employing an application program interface (API); and
   in response to the setting type indicating, instruct the setting of the setting value for the setting item employing an intent function of an operating system.

* * * * *